(12) United States Patent
Horii et al.

(10) Patent No.: US 7,600,260 B2
(45) Date of Patent: Oct. 6, 2009

(54) INFORMATION RECORDING MEDIUM AND REPRODUCTION APPARATUS THEREFOR

(75) Inventors: Noriaki Horii, Osaka (JP); Masatoshi Shimbo, Kawanishi (JP); Yoshihiro Mori, Hirakata (JP)

(73) Assignee: Panasonic Corporation, Kadoma (JP)

( * ) Notice: Subject to any disclaimer, the term of this patent is extended or adjusted under 35 U.S.C. 154(b) by 429 days.

(21) Appl. No.: 10/562,337

(22) PCT Filed: Jun. 28, 2004

(86) PCT No.: PCT/JP2004/009479

§ 371 (c)(1),
(2), (4) Date: May 25, 2006

(87) PCT Pub. No.: WO2005/001831

PCT Pub. Date: Jan. 6, 2005

(65) Prior Publication Data

US 2007/0277243 A1    Nov. 29, 2007

(30) Foreign Application Priority Data

Jun. 30, 2003   (JP)   .............................. 2003-186806
Oct. 29, 2003   (JP)   .............................. 2003-369695

(51) Int. Cl.
*G06F 7/04* (2006.01)
*G06F 17/30* (2006.01)
*H04N 7/16* (2006.01)
*G11B 7/00* (2006.01)
*G11B 7/005* (2006.01)
*G11B 7/26* (2006.01)
*H04N 5/76* (2006.01)
*H04N 5/781* (2006.01)

(52) U.S. Cl. ........................ 726/26; 369/47.24; 386/95; 386/96; 386/125

(58) Field of Classification Search ................... 726/26; 369/275, 47.24; 386/95, 96, 125
See application file for complete search history.

(56) References Cited

U.S. PATENT DOCUMENTS

| 6,343,281 | B1 | 1/2002 | Kato |
| 6,687,211 | B2 * | 2/2004 | Sawabe et al. ........... 369/275.3 |
| 2001/0043798 | A1 * | 11/2001 | Ko et al. ....................... 386/95 |
| 2002/0101804 | A1 * | 8/2002 | Sawabe et al. ........... 369/47.24 |
| 2002/0172117 | A1 * | 11/2002 | Sako et al. ............... 369/53.29 |
| 2004/0047602 | A1 * | 3/2004 | Ohbi et al. .................... 386/95 |

FOREIGN PATENT DOCUMENTS

| DE | 296 19 764 U1 | 2/1997 |
| EP | 0 777 227 A1 | 6/1997 |

(Continued)

OTHER PUBLICATIONS

International Search Report for corresponding Application No. PCT/JP2004/009479 mailed Mar. 22, 2005.

*Primary Examiner*—Shin-Hon Chen
(74) *Attorney, Agent, or Firm*—Renner, Otto, Boisselle & Sklar, LLP

(57) ABSTRACT

An information recording medium includes a first recording area for recording first information and first management information regarding handling of the first information; and a second recording area for recording second information generated based on the first information, and second management information regarding handling of the second information.

7 Claims, 26 Drawing Sheets

FOREIGN PATENT DOCUMENTS

| | | |
|---|---|---|
| EP | 0 817 195 A2 | 1/1998 |
| EP | 1 152 412 A1 | 11/2001 |
| EP | 1 333 438 A1 | 8/2003 |
| EP | 1 457 983 A1 | 9/2004 |
| GB | 2 344 925 A | 6/2000 |
| JP | 11-288555 | 10/1999 |
| JP | 2000-173182 | 6/2000 |
| JP | 2001-243704 | 9/2001 |
| WO | 00/51121 | 8/2000 |
| WO | 02/37494 A1 | 5/2002 |

* cited by examiner

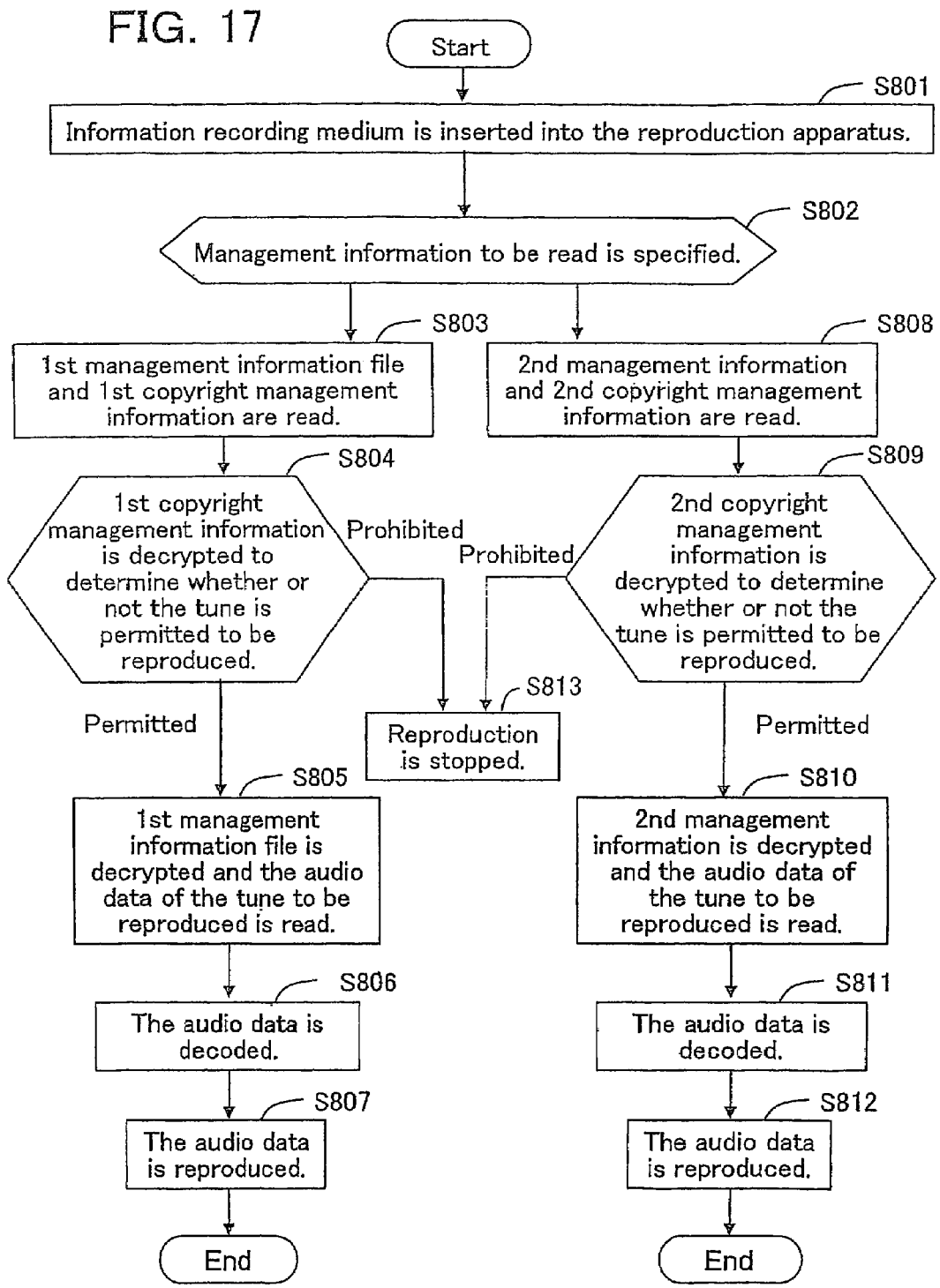

INFORMATION RECORDING MEDIUM AND REPRODUCTION APPARATUS THEREFOR

TECHNICAL FIELD

The present invention relates to an information recording medium and a reproduction apparatus for reproducing information from the information recording medium. In particular, the present invention relates to an information recording medium which is divided into a plurality of areas and allows information to be recorded in each of the plurality of areas, and a reproduction apparatus for reproducing information from such an information recording medium.

BACKGROUND ART

Recently, large capacity information recording mediums represented by DVD discs have been developed. Conventional CDs (compact discs) have a recording capacity of 650 MB, whereas DVD discs have a recording capacity of 4.7 GB on one surface. Currently, higher density information recording mediums using blue laser have been developed. This allows a higher quality content to be recorded on one information recording medium for a longer time than in a CD. For example, one CD allows a music content of 44.1 kHz/16 bits/2 ch to be recorded thereon for about 74 minutes. A DVD-Audio disc allows a content of a maximum of 192 kHz/24 bits/2 ch or a maximum of 96 kHz/24 bits/6 ch to be recorded thereon for about the same length of time. A DVD-Audio disc allows a music content of 44.1 kHz/16 bits/2 ch to be recorded thereon for about 6 times longer than a CD. (See, for example, DVD Specifications for Read-only Disc, Part 4, AUDIO SPECIFICATIONS Version 1.2.)

Recently, various types of compression recording systems represented by mp3 have been invented, and a music content is recorded using such compression recording systems. In the case where, for example, a 5-minute tune is recorded using 128 kbps mp3, the data amount is about 5 MB. When a 5-minute tune is recorded on a CD (44.1 kHz/16 bits/2 ch), the data amount is about 50 MB. The data amount recorded using 128 kbps mp3 is only $\frac{1}{5}$ of the data amount recorded on a CD.

In order to prevent a content from being illegally copied, the content is recorded on an information recording medium in the state of being encrypted. A music content recorded on, for example, a DVD-Audio disc is encrypted using a certain encryption technology. In the case where a copyright management information regarding the copyright of the encrypted music content is recorded on the information recording medium, the copyright indicated by the copyright management information can be applied when copying the music content. In the case where, for example, the copyright management information indicates that the content is permitted to be copied only once, the content is controlled to be permitted to be copied once and not to be permitted to be copied anymore. It is possible to record such copyright management information as to completely prohibit the content from being copied.

A label gate CD has contents recorded thereon as follows. One label gate CD is divided into two sessions. In one session, a music content treated with CCCD (Copy Control CD) is recorded. CCCD is a copy protection technology, and a content treated with CCCD is unreadable by a usual CD-ROM drive. In the other session, a music content to be reproduced using a CD-ROM drive is recorded. In this case, a usual CD reproduction apparatus reproduces the music content treated with CCCD, and a personal computer reproduces the music content to be reproduced by the CD-ROM drive. However, the label gate CD does not have information recorded which indicates the relationship between the two types of music contents recorded in the two sessions. Accordingly, the music contents recorded in the two sessions cannot be handled differently in accordance with the reproduction conditions, copying conditions or the like. In addition, a personal computer cannot read the music content treated with CCCD, and thus cannot controllably reproduce or copy such a music content.

A DVD-Audio disc can allow a high quality music content to be recorded thereon. Therefore, a music company which creates a music content to be recorded on DVD-Audio discs may desire that such a high quality music content should not be copied. However, users listening to the content of the DVD-Audio discs desire to copy the music content recorded on the DVD-Audio discs for his/her personal use.

There is another problem as follows. Even if a high quality music content recorded on the DVD-Audio discs is permitted to be copied, it is time-consuming to copy the content due to a large data amount of the content. For example, a 5-minute tune recorded on a CD (44.1 kHz/16 bits/2 ch) has a data amount of about 50 MB, whereas a 5-minute tune recorded on a DVD-Audio disc (44.1 kHz/24 bits/6 ch) has a data amount of about 240 MB. Therefore, it takes about five times longer to copy the music content recorded on a DVD-Audio disc than to copy the music content recorded on a CD.

When reproducing a music content using a portable reproduction apparatus, there is a general problem of power consumption. Portable reproduction apparatuses are driven by storage cells. When reproduction of data requires a larger power consumption, the time in which the data can be reproduced is shorter. The high quality music content recorded on a DVD-Audio disc has a large data amount. When the data amount of the music content is significantly larger than the memory capacity of a portable reproduction apparatus, it is impossible to store all the data of the music content in the memory of the portable reproduction apparatus before reproduction. Therefore, the DVD-Audio disc needs to be rotated to have the data read therefrom while the data is being reproduced by the portable reproduction apparatus. The power for rotating the DVD-Audio disc is required, which makes long-time reproduction difficult.

DISCLOSURE OF THE INVENTION

According to one aspect of the invention, an information recording medium includes a first recording area for recording first information and first management information regarding handling of the first information; and a second recording area for recording second information generated based on the first information, and second management information regarding handling of the second information.

In one embodiment of the invention, the second management information includes link information which indicates that the first information and the second information are related to each other.

In one embodiment of the invention, the first management information includes a group number and a track number for specifying the first information; and the link information includes an identification number for specifying the second information which is linked with the first information.

In one embodiment of the invention, the first recording area further includes first copyright management information regarding a copyright of the first information; and the second recording area further includes second copyright management information regarding the copyright of second information, which is independent from the first copyright management information.

In one embodiment of the invention, the second copyright management information includes inherent information for identifying the second information; and copy management information indicating a copying condition for the second information.

In one embodiment of the invention, the second copyright management information includes transaction information which indicates whether or not copyright management information, which is different from the second copyright management information, is applicable to the second information.

In one embodiment of the invention, the copy management information indicates at least one of: whether or not copying is permitted; the number of times that the copying is permitted; and the quality at which the copying is permitted.

In one embodiment of the invention, the first information is encrypted by a first encryption system; and the second information is encrypted by a second encryption system.

In one embodiment of the invention, a part of an encryption algorithm of the first encryption system and a part of an encryption algorithm of the second encryption system are identical to each other.

In one embodiment of the invention, the first encryption system includes encryption using information which is common to the second encryption system.

In one embodiment of the invention, the common information is encryption key generation information used for generating an encryption key.

In one embodiment of the invention, the first information is one of non-compressed information and reversibly compressed information. When the first information is non-compressed information, the second information is information obtained by irreversibly compressing the first information. When the first information is reversibly compressed information, the second information is information obtained by irreversibly compressing non-compressed information which is generated by decoding the first information.

In one embodiment of the invention, a plurality of pieces of second information are generated based on the first information; and the generated plurality of pieces of second information are different from each other in attribute.

In one embodiment of the invention, the first information and the second information are audio information; and the attribute indicates at least one of recording system, compression ratio, number of channels, sampling frequency, quantization bit number, bit rate, and reproduction time.

In one embodiment of the invention, different copyrights are applied to the plurality of pieces of second information.

In one embodiment of the invention, different encryption systems are applied to the plurality of pieces of second information.

In one embodiment of the invention, at least one of the plurality of pieces of second information is encrypted by a plurality of encryption systems.

In one embodiment of the invention, the second recording area further includes third management information regarding handling of the second information; the second management information includes first link information which indicates that the first information and the second information are related to each other; and the third management information does not include the first link information.

In one embodiment of the invention, the second management information includes second link information which indicates that the second management information and the third management information are related to each other.

In one embodiment of the invention, the first recording area further includes first copyright management information regarding a copyright of the first information. The second recording area further includes second copyright management information regarding a copyright of the second information, which is independent from the first copyright management information, and third copyright management information regarding the copyright of the second information, which is independent from the first copyright management information and the second copyright management information.

In one embodiment of the invention, the second recording area further includes synchronous reproduction information which is reproduced in synchronization with the second information; and synchronous reproduction management information regarding handling of the synchronous reproduction information.

In one embodiment of the invention, the second management information includes link information which indicates that the second management information and the synchronous reproduction management information are related to each other.

In one embodiment of the invention, the link information indicates a type and a file name of the synchronous reproduction management information.

In one embodiment of the invention, the second recording area further includes first copyright management information regarding a copyright of the second information; and second copyright management information regarding copyright of the synchronous reproduction information.

In one embodiment of the invention, the first information and the second information each include at least one of audio information, moving picture information, still picture information, and text information.

In one embodiment of the invention, the first information, the second information, and the synchronous reproduction information each include at least one of audio information, moving picture information, still picture information, and text information.

According to another aspect of the invention, a reproduction apparatus for reproducing at least one of first information and second information generated based on the first information which are recorded on an information recording medium. The information recording medium includes a first recording area for recording the first information and first management information regarding handling of the first information; and a second recording area for recording the second information, and second management information regarding handling of the second information. The reproduction apparatus includes a reading section for reading at least one of the first information, the first management information, the second information, and the second management information from the information recording medium; a first storage section having, stored therein, at least one of first decryption information for decrypting the first management information, and second decryption information for decrypting the second management information; a first decryption section for decrypting at least one of the first management information and the second management information; and an output section for outputting at least one of the first information and the second information. When the first storage section stores the first decryption information and the first information is to be reproduced; the reading section reads the first management information from the information recording medium; the first decryption section decrypts the first management information based on the first decryption information; and based on the decryption result of the first management information, the reading section reads the first information, and the output section outputs the first information. When the first storage section stores the second decryption information and the second information is to be reproduced; the reading section reads the second management information from the information recording medium; the first decryption section decrypts the second management information based on the second decryption information; and based on the decryption result of the second management information, the reading section reads the second information, and the output section outputs the second information.

In one embodiment of the invention, when the second information is not reproduceable, the reading section reads the first information from the information recording medium.

In one embodiment of the invention, when the first information is not reproduceable, the reading section reads the second information from the information recording medium.

In one embodiment of the invention, the reproduction apparatus is driven by a power provided from at least one of an external power supply and a cell included in the reproduction apparatus. The reproduction apparatus further comprises a determination section for determining a source of the power. When the determination section determines that the power is provided from the external power supply and the first information is to be reproduced, the reading section reads the first information. When the determination section determines that the power is not provided from the external power supply, the reading section reads the second information.

In one embodiment of the invention, the second management information includes link information which indicates that the first information and the second information are related to each other. When the reproduction apparatus receives an instruction to copy the first information; the reading section reads the link information from the information recording medium; the first decryption section decrypts the link information and specifies the second information which is related to the first information; and the reading section reads the specified second information, and the output section outputs the specified second information.

In one embodiment of the invention, the first recording area further includes first copyright management information regarding a copyright of the first information. The second recording area further includes second copyright management information regarding a copyright of the second information. The reproduction apparatus further includes a second storage section having, stored therein, third decryption information for decrypting the first copyright management information, and fourth decryption information for decrypting the second copyright management information, and a second decryption section for decrypting at least one of the first copyright management information and the second copyright management information. When the reproduction apparatus receives an instruction to copy the first information and the first copyright management information indicates that the first information is prohibited from being copied; the reading section reads the second copyright management information; the second decryption section decrypts the second copyright management information. When the second copyright management information indicates that the second information is permitted to be copied, the reading section reads the second information, and the output section outputs the second information.

In one embodiment of the invention, the first information is encrypted by a first encryption system, and the second information is encrypted by a second encryption system. The reproduction apparatus further comprises at least one of a first decoding section for decoding the encrypted first information, and a second decoding section for decoding the encrypted second information.

In one embodiment of the invention, the first information is encrypted by a first encryption system, and the second information is encrypted by a second encryption system. A part of an encryption algorithm of the first encryption system and a part of an encryption algorithm of the second encryption system are identical to each other. The reproduction apparatus further comprises a common decoding section for decoding a portion of the first information and a portion of the second information, the portions being encrypted by the identical parts of the encryption algorithms, a first decoding section for decoding another portion of the first information which is encrypted by an algorithm which uses the first encryption system but does not use the second encryption system, and a second decoding section for decoding another portion of the second information which is encrypted by an algorithm which uses the second encryption system but does not use the first encryption system. For reproducing the first information, the first information read by the reading section is decoded by the common decoding section and the first decoding section. For reproducing the second information, the second information read by the reading section is decoded by the common decoding section and the second decoding section.

In one embodiment of the invention, the second recording area further includes third management information regarding handling of the second information. The second management information includes link information which indicates that the first information and the second information are related to each other. The third management information does not include the link information. The first storage section stores at least one of the first decryption information and the second decryption information, and also stores third decryption information for decrypting the third management information. For reproducing the second information, the reading section reads the second information based on the result of decrypting at least one of the second management information and the third management information.

In one embodiment of the invention, the second recording area further includes synchronous reproduction information which is reproduced in synchronization with the second information, and synchronous reproduction management information regarding handling of the synchronous reproduction information. The second management information includes link information which indicates that the second management information and the synchronous reproduction management information are related to each other. The first storage section further stores third decryption information for decrypting the synchronous reproduction management information. For reproducing the second information; the reading section reads the second management information and the synchronous reproduction management information; the first decryption section decrypts the second management information and the synchronous reproduction management information; and based on the result of decrypting the second management information and the synchronous reproduction management information, the reading section reads the second information and the synchronous reproduction information, and the output section outputs the second information and the synchronous reproduction information in synchronization with each other.

In one embodiment of the invention, the second recording area includes a plurality of pieces of second information. The plurality of pieces of second information are different from each other in attribute. The reproduction apparatus further includes a selection section for selecting one of the plurality of pieces of second information based on at least one of a reproduction condition and a copying condition. The reading section reads the selected second information.

In one embodiment of the invention, the first information and the second information each include at least one of audio information, moving picture information, still picture information, and text information.

In one embodiment of the invention, the first information, the second information, and the synchronous reproduction information each include at least one of audio information, moving picture information, still picture information, and text information.

Thus, the invention described herein makes possible the advantages of providing an information recording medium having a plurality of different types of contents which can be used differently in accordance with various conditions, so as to realize high speed copying and long-time reproduction of the contents; and a reproduction apparatus therefor.

These and other advantages of the present invention will become apparent to those skilled in the art upon reading and understanding the following detailed description with reference to the accompanying figures.

BRIEF DESCRIPTION OF THE DRAWINGS

FIG. 17 is a flowchart for reproducing a tune by the reproduction apparatus shown in FIG. 15.

BEST MODE FOR CARRYING OUT THE INVENTION

Hereinafter, the present invention will be described by way of illustrative examples with reference to the accompanying drawings.

Example 1

Figure 1:
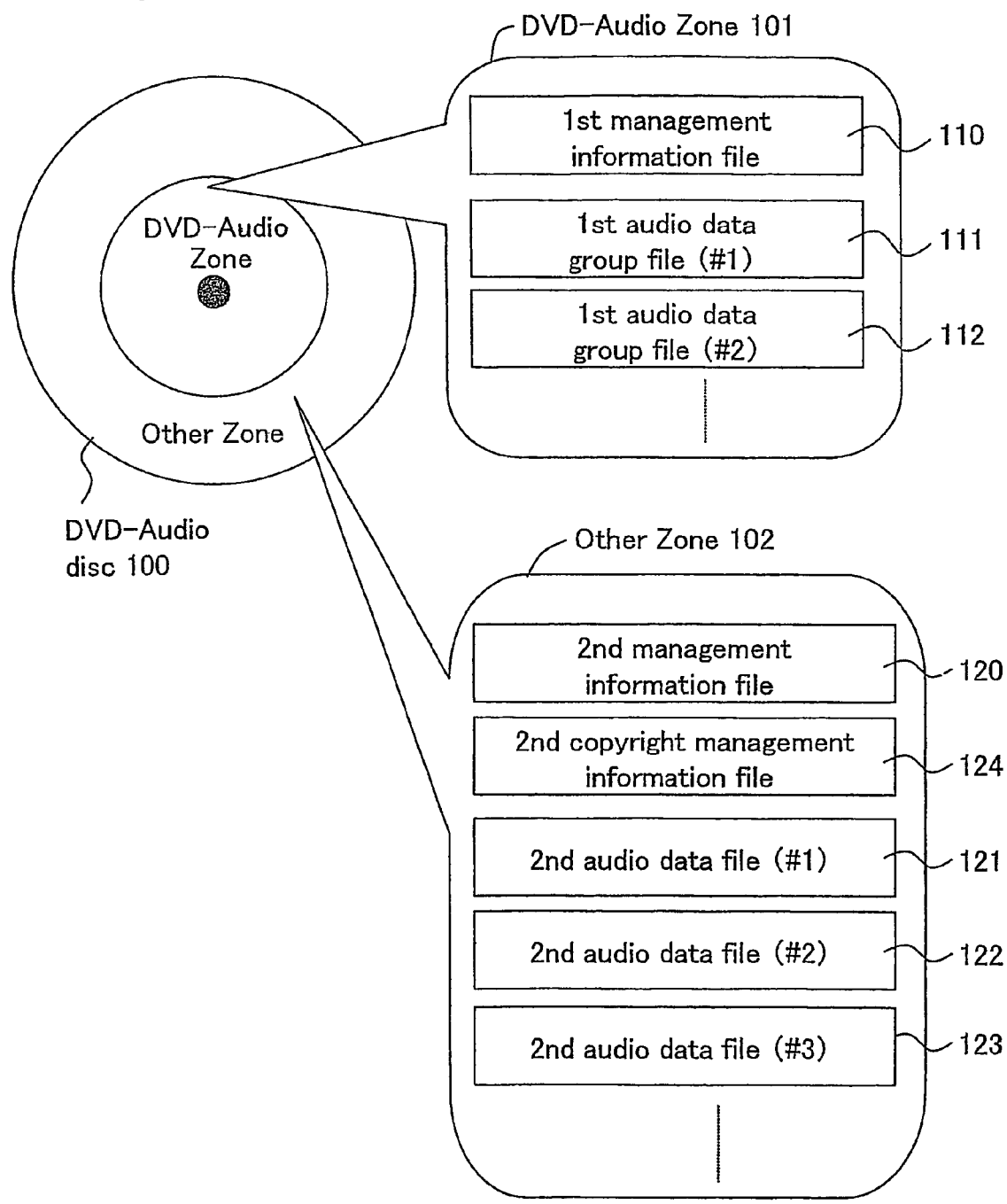
FIG. 1 shows an information recording medium according to an example of the present invention.

An information recording medium according to the present invention is divided into a plurality of areas. Each area includes a management information file, an audio data file, and a copyright management information file. FIG. 1 shows a DVD-Audio disc 100 according to a first example of the present invention. The DVD-Audio disc 100 includes a DVD-Audio Zone 101 and an Other Zone 102.

The DVD-Audio Zone 101 includes, recorded therein, first audio data group files 111 and 112 each including audio data indicating at least one tune, and a first management information file 110 for managing handling of the first audio data group files 111 and 112.

The Other Zone 102 includes, recorded therein, second audio data files 121, 122 and 123 each representing one tune, a second management information file 120 for managing handling of the second audio data files 121, 122 and 123, and a second copyright management information file 124 for managing handling of a copyright of the tune represented by each of the second audio data files 121, 122 and 123.

Figure 2:
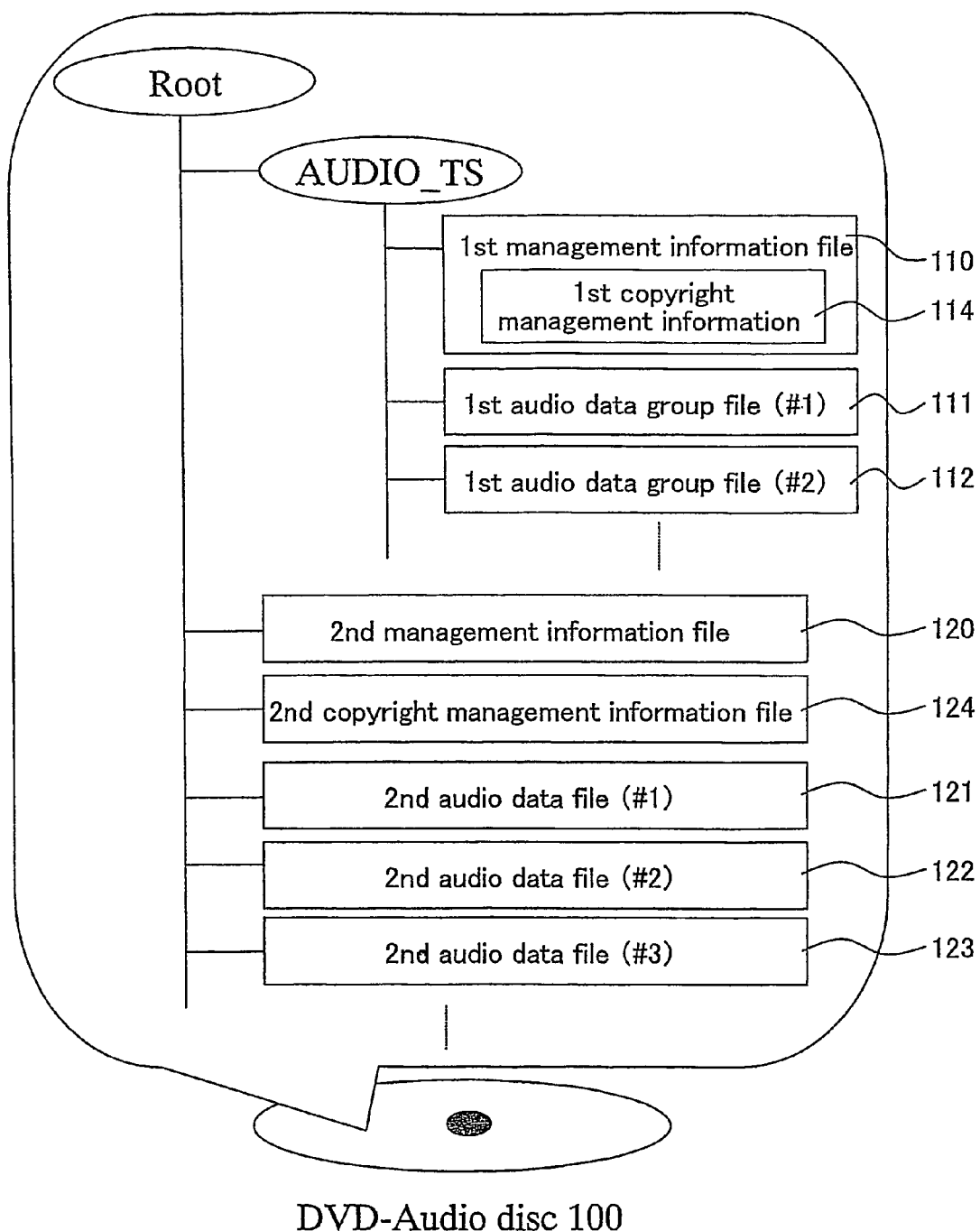
FIG. 2 shows a file structure of an information recording medium according to an example of the present invention.

Specifically, as shown in FIG. 2, the first management information file 110 and the first audio data group files 111 and 112 are recorded in an AUDIO_TS directory. The second management information file 120, the second copyright management information file 124, and the second audio data files 121, 122 and 123 are recorded in a Root directory. The first management information file 110 includes first copyright management information 114 regarding copyrights of the audio data group files 111 and 112.

Alternatively, another directory is created in the Root directory, and the second management information file 120, the second copyright management information file 124 and the second audio data files 121, 122 and 123 may be recorded in the another directory.

In the figures, the symbol "#a" ("a" is an integer) represents the serial number of the information in the corresponding information group. For example, a serial number indicates the position of each tune in the order of the tunes.

A second audio data file is created from the audio data included in a first audio data group file. Here, the second audio data files 121, 122 and 123 are audio data obtained by converting the corresponding audio data included in the first audio data group files 111 and 112 using a prescribed recording system. For example, the audio data indicating one tune included in the first audio data group file 111 is recorded by a recording system of linear PCM, and that audio data is compressed by a recording system of mp3 to create the second audio data file 121. The second audio data files 121, 122 and 123 may be recorded by different systems. For example, one second audio data file may be recorded by mp3, and another second audio data file may be recorded by a recording system of AAC.

Figure 3:
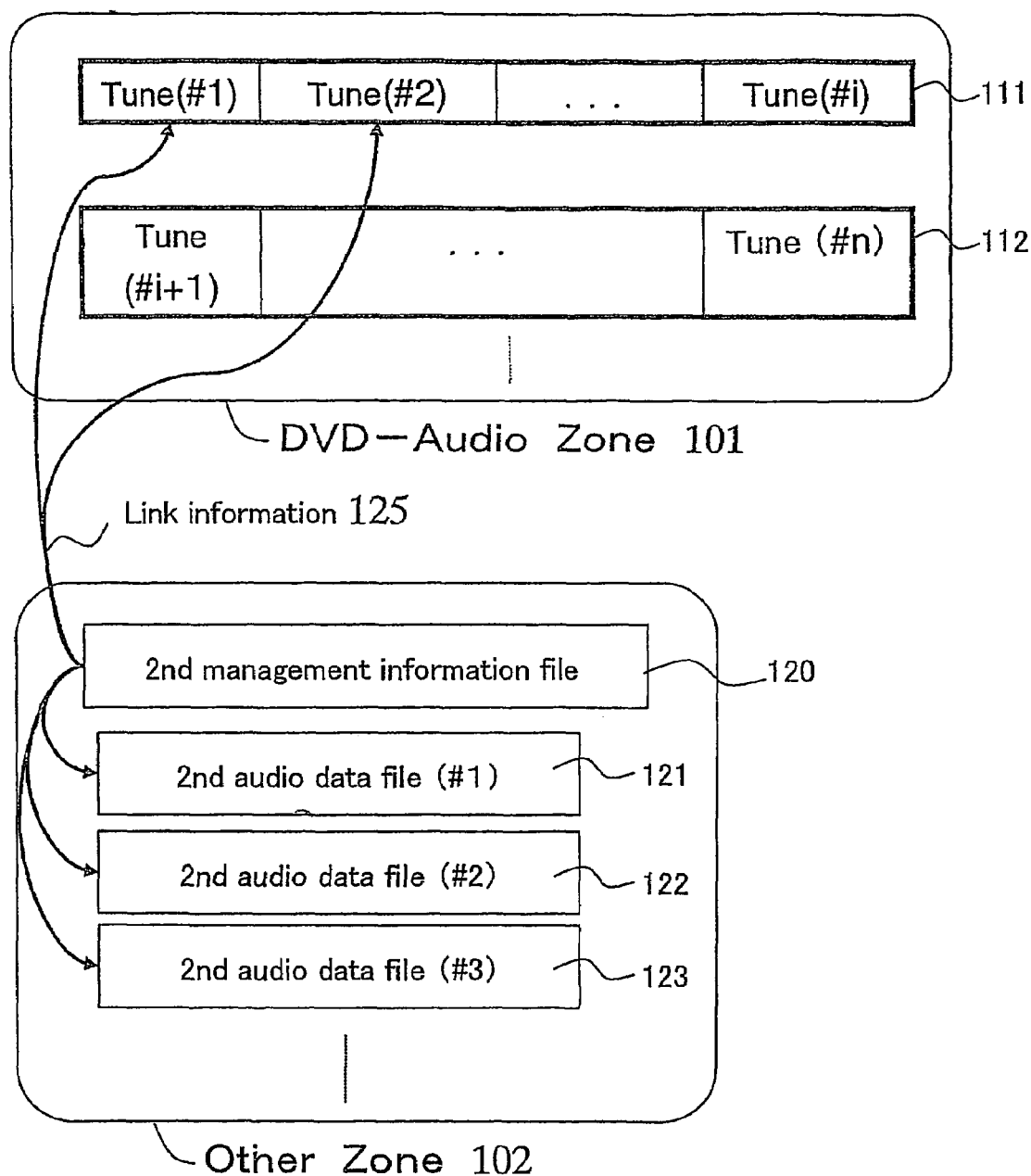
FIG. 3 shows links according to an example of the present invention.

As shown in FIG. 3, each of the tunes indicated by each first audio data group file is linked to one second audio data file. Link information 125 indicating the linking (i.e., that each of the tunes indicated by each first audio data group file is linked to one second audio data file) is included in the second management information file 120.

Figure 4A:
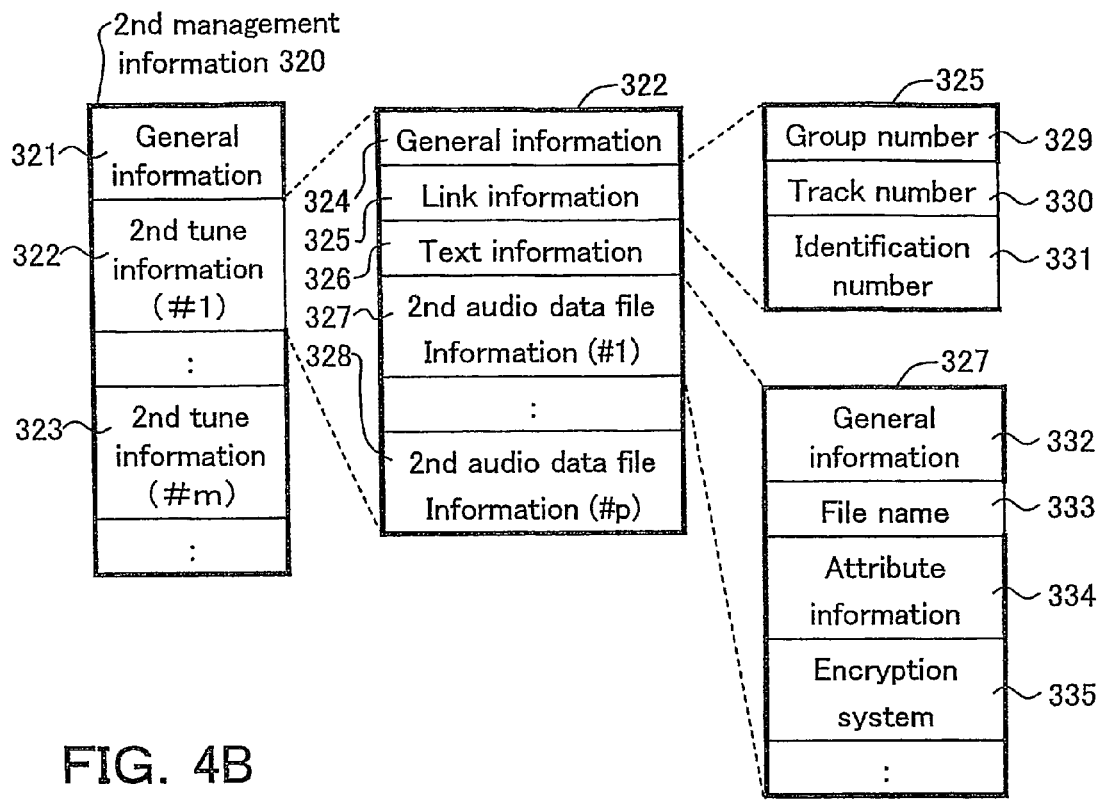
FIG. 4A shows a data structure according to an example of the present invention.

FIG. 4A shows an example of specific second management information 320 included in the second management information file 120. The second management information 320 shown in FIG. 4A includes general information 321 and second tune information 322 and 323.

The second tune information 322 indicates the information of the tune indicated by a corresponding second audio data file included in the Other Zone 102. The second tune information 323 also indicates the information of the tune indicated by a corresponding second audio data file included in the Other Zone 102. Each of the second tune information 322 and 323 includes general information 324, link information 325, text information 326, and second audio data file information 327 and 328. The second audio data file information 327 and 328 is related to the second audio data file indicating the corresponding tune. The text information 326 indicates the title, the name of the artist and the like of the corresponding tune. The link information 325 allows the tune in the first audio data group file, from which the corresponding second audio data file was created, to be specified. (Such a tune will also be referred to as "tune of origin".)

Each tune recorded in the DVD-Audio disc 100 is uniquely identified by the group number and the track number. The first management information file 110 includes a group number and a track number for specifying each tune included in the first audio data group file. The link information 325 includes a group number 329 and a track number 330 of the tune, from which the corresponding second audio data file was created, and an identification number 331 of the corresponding second audio data file.

The link information 325 may include a recording start physical address and a recording end physical address of the tune, from which corresponding second audio data file was created, instead of the group number 329 and the track number 330. The link information 325 may include all the group number 329, the track number 330, the recording start physical address, and the recording end physical address. The present invention is applicable to other applications and other types of information recording mediums in addition to DVD-Audio discs. In this case, any information which can uniquely specify the tune in the application or the information recording medium may be used as the information for specifying the tune.

Each of the second audio data file information 327 and 328 includes general information 332, a file name 333, attribute information 334, and an encryption system 335.

Figure 5:
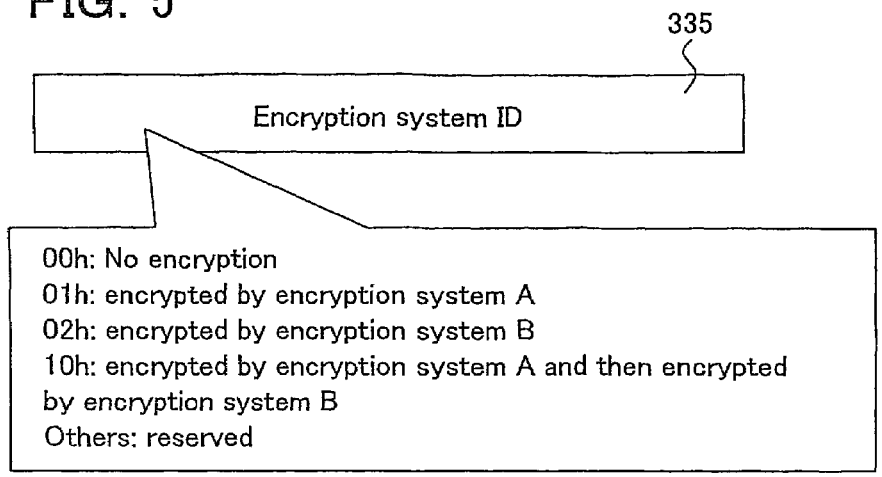
FIG. 5 shows an encryption system according to an example of the present invention.

The attribute information 334 indicates the attribute of the audio data (for example, the recording system, compression rate, number of channels, sampling frequency, quantization bit number, bit rate, reproduction time). The encryption system 335 indicates the information for specifying the encryption system used for encrypting the corresponding file. Different files may be encrypted by different encryption systems. The encryption system 335 may also indicate that the file is encrypted by a plurality of encryption systems (for example, double encryption). For example, an ID (1 byte) for specifying the encryption system is defined as shown in FIG. 5 (00h: no encryption; 01h: encrypted by encryption system A; 02h: encrypted by encryption system B; 10h: encrypted by encryption system A and then encrypted by encryption system B; Others: reserved). In this example, in the case where the corresponding second audio data file is first encrypted by encryption system A and then encrypted by encryption system B, the encryption system 335 indicates 10h.

The encryption system may be included in the second audio data file information, but may be included in second tune copyright management information (which will be described in detail later).

One piece of second tune information may manage a plurality of audio data files which are different in the attribute (for example, the recording system, compression rate, number of channels, sampling frequency, quantization bit number, bit rate, reproduction time). For example, one tune indicated by a first audio data group file (tune of origin) may be compressed by a plurality of recording systems (mp3, AAC, etc.) to produce a plurality of audio data files, which are recorded in the Other Zone 102. The second tune information includes and manages a plurality of pieces of second audio data file information. An example of such management will be described with reference to FIG. 8.

Figure 8:
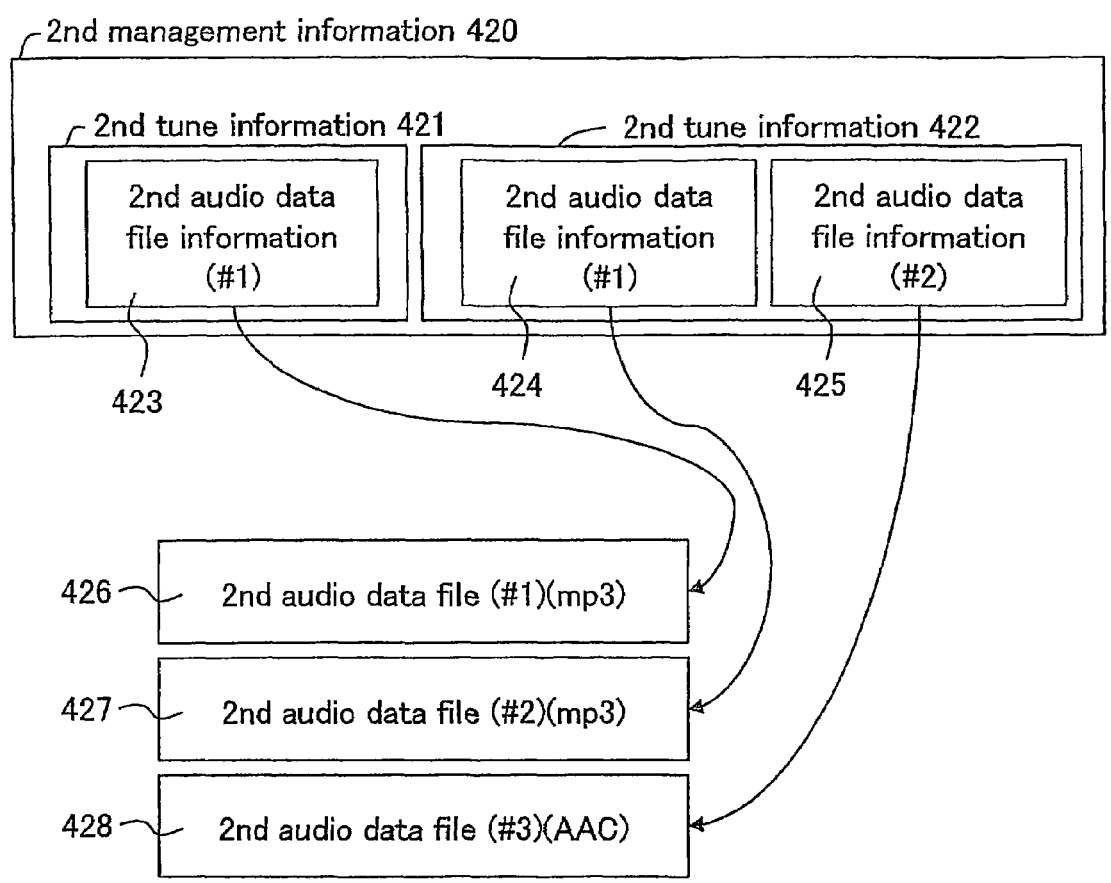
FIG. 8 shows the relationship between management information and audio data files according to an example of the present invention.

Second management information 420 shown in FIG. 8 includes second tune information 421 and second information 422. The second tune information 421 includes second audio data file information 423 for managing one second audio data file 426 compressed by mp3. The second information 422 includes second audio data file information 424 for managing one second audio data file 427 compressed by mp3 and second audio data file information 425 for managing one second audio data file 428 compressed by AAC. The second audio data file 427 and the second audio data file 428 are created from the same tune of origin, but are different in terms of attribute (for example, recording system). Two audio data files which are different in terms of attribute can be managed by using the second tune information 422.

The plurality of audio data files may be the same in terms of attribute and different in terms of encryption system. For example, one audio data file among the plurality of audio data files may be encrypted by one encryption system and the other audio data file may be encrypted by a plurality of encryption systems. Such a plurality of audio data files may be managed using the same second tune information.

Different copyrights may be applied to the plurality of audio files. Such a plurality of audio files may be managed using the same second tune information.

As described above, a plurality of audio data files which are different in terms of attribute (or in terms of encryption system or copyright) may be recorded in the Other Zone 102 for one tune recorded in the DVD-Audio Zone 101. Owing to this, the reproduction apparatus can select and use the optimum audio data file among the plurality of audio data files in accordance with various conditions for reproduction or copying. An example in which a plurality of second audio data files recorded by linear PCM, mp3 and AAC are managed using the same second tune information will be described. For reproducing a high quality second audio data file, the reproduction apparatus reproduces the second audio data file recorded by linear PCM. The reproduction apparatus may select the second audio data file which is recorded by a recording system which is reproduceable by the reproduction apparatus. For example, when the reproduction apparatus can reproduce only the audio data recorded by mp3, the reproduction apparatus selects the second audio data file recorded by mp3. In the case where audio data is reproduced by an external device connected to the reproduction apparatus, for example, an amplifier, the reproduction apparatus may select the audio data which is reproduceable by that external device and outputs the selected audio data to the external device. For example, when the external device can reproduce only the audio data recorded by AAC, the reproduction apparatus selects the second audio data file recorded by AAC and outputs the selected audio data to the external device. In the case where the reproduction apparatus is connected to the Internet, a wired LAN, or a wireless LAN and data is to be reproduced by a device connected to the Internet, the wired LAN, or the wireless LAN, the reproduction apparatus may select and output the compressed second audio data file. When a tune is to be reproduced by a plurality of external devices connected to the reproduction apparatus, the compressed second audio data file may be selected and output due to a factor of transfer rate or the like.

In the case where the reproduction apparatus outputs a second audio data file for copying, the optimum second audio data may be output in accordance with the copying conditions. For example, in the case where a plurality of second audio data files recorded by linear PCM, mp3 and AAC are managed using second tune information and the information recording medium to which the data is to be copied is only compatible with mp3, the reproduction apparatus selects the second audio data file recorded by mp3. For high speed copying, the reproduction apparatus selects the second audio data file having the smallest data amount, i.e., compressed at the highest compression rate.

The link information may be included in the second management information separately from the second tune information. For example, second management information 350 shown in FIG. 6 includes general information 351, link group information 352, and second tune information 353 and 354. The second management information 350 includes the link group information 352 separately from the second tune information 353 and 354.

The link information group 352 includes general information 355a, and group link information 355b and 355c. Each of the group link information 355b and 355c includes general information 356 and tune link information 357 and 358. The tune link information includes information for specifying the second audio data file linked with each of the tunes recorded in the DVD-Audio Zone 101 (for example, information defined by the DVD-Audio Standards). For example, the tune link information 357 in the group link information 355b includes track number 1 of group number 1 in the DVD-Audio Zone 101 and the tune number of the second audio data file linked with the track number 1 of group number 1 (i.e., a second tune number 359). In the case where there is no second audio data file linked with a tune in the DVD-Audio Zone 101, a value determined as the second tune number, for example, the value of "0" is recorded. In the case where the second management information has the concept of "group" or "play list" including a plurality of tunes, data can be recorded as follows. The group and play list numbers in the Other Zone 102 which correspond to a certain group in the DVD-Audio Zone 101 are included in the general information 356, and the tune number in the corresponding group and play list in the Other Zone 102 is recorded as the second tune number in the tune link information. Any information which can specify a certain tune in the Other Zone 102 may be used as the tune link information, and information other than the second tune number may be recorded.

Any name is usable as the file name of the second audio data file. It is desirable to use a name for identifying the tune of origin and an extension for identifying the recording system of the second audio data file. For example, in the case where a tune having group number 2 and track number 3 in the DVD-Audio Zone 101 is compressed by mp3 to create a second audio data file, the file name of the created file is desirably GR2_TK03.mp3. In this case, the tune of origin, and also the recording system, can be uniquely specified only by the file name, without the time and energy of decrypting the second management information.

The second tune information may manage a tune which is not recorded in the DVD-Audio Zone 101 in addition to a tune created from a tune recorded in the DVD-Audio Zone 101. In this case, as the group number or track number included in the second tune information, data which indicates that the tune is different from the tune recorded in the DVD-Audio Zone 101 is used. For example, data in which all the bits are 0, or data in which all the bits are 1, is used as the group number or track number. In this case, the extension of the file name desirably indicates the recording system, and the remaining portion of the file name may be anything. It is desirable to add "NEW_TK", which indicates that the tune is a new tune and add the serial number to the file name. For example, a file name of a second audio data file recorded by mp3 is desirably NEW_TK01.mp3.

It is preferable to describe the file name of a second audio data file in accordance with a certain rule. Then, the second audio data file managed by the second audio data file information can be specified without referring to the file name included in the second audio data file information. For example, when it is determined that the file name of a second audio data file is formed of the group number, the track number and the recording system, as GR2_TK03.mp3, the file name of the target second audio data file can be specified based on the group number and the track number included in the link information on the second tune information and based on the recording system indicated by the attribute included in the second audio data file information.

Alternatively, a file name may be created as follows. A common character string is determined for the second audio data files, and each second audio data file information is provided with a serial number, which is a positive numerical figure. The file name of a second audio data file is formed of the common character string and the serial number. For example, in the case where the common character string is "AUDIO" and the serial number provided to second audio data file information is 14, the file name of the second audio data file managed by the second audio data file information is formed of the character string "AUDIO14" and an extension. Any extension may be added to "AUDIO14".

As described above, it is preferable to describe the file name of a second audio data file in accordance with a certain rule. Then, the target second audio data file can be specified without referring to the file name in the second audio data file information. In this case, it is not necessary that the file name of the second audio data file is included in the management information, although the file name may be included in the management information.

A file name may be created such that it can be checked whether or not the second audio data file having that file name is encrypted. For example, the file name of an encrypted file includes SA (Secure Audio) in the extension, and the file name of an unencrypted file includes an extension which can specify the recording system (for example, the letters of "mp3"). Then, it can be determined whether the file is encrypted or not only by checking the file name. Even a reproduction apparatus which cannot decrypt the second management information file 120 can specify a reproduceable file, i.e., a file which is not encrypted and can be decrypted.

Figure 4B:
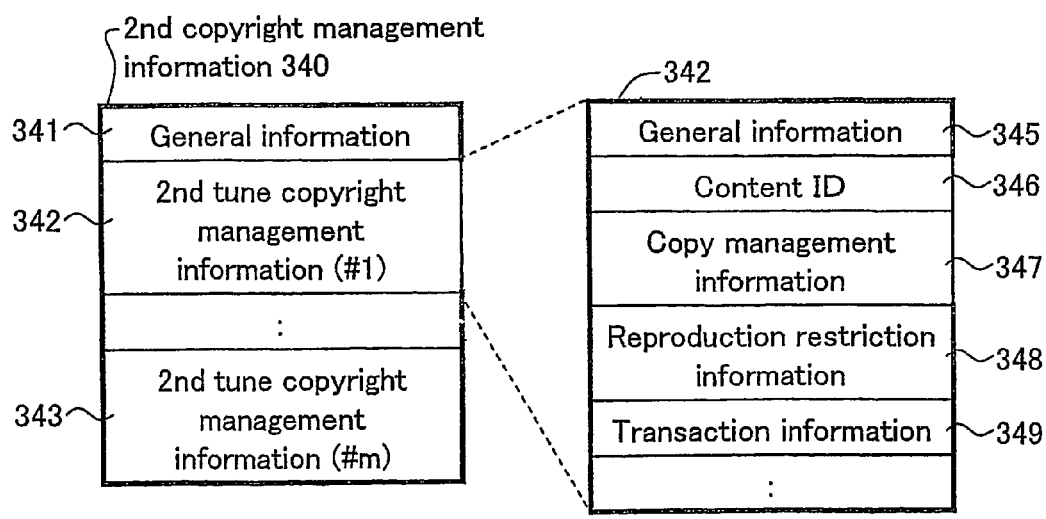
FIG. 4B shows a data structure according to an example of the present invention.

The Other Zone 102 includes the second copyright management information file 124 for managing the copyright of each second audio data files. FIG. 4B shows an example of second copyright management information 340 included in the second copyright management information file 124. The second management information 340 includes general information 341, and second tune copyright management information 342 and 343 indicating copyright management information for the corresponding tune.

The order by which the second tune copyright management information is recorded is the same as the order by which the second tune information is recorded in the second management information 320. Namely, the copyright information of the tune managed by the second tune information (#1) is included in the second tune copyright management information (#1).

The second tune copyright management information includes general information 345, a content ID 346 indicating an inherent number for identifying the corresponding tune (inherent information), copy management information 347 for defining the copying conditions, reproduction restriction information 348 for defining the conditions under which reproduction is permitted, and transaction information 349. The transaction information 349 includes a flag which indicates whether or not it is possible to perform processing not designated by the second tune copyright management information when the reproduction apparatus is authenticated to be of a different system, and the type of processing (for example, processing of applying copyright management information, which is different from the second tune copyright management information, to a second audio data file).

The content ID 346 includes, for example, an ISRC (International Standard Recording Code). The copy management information 347 includes at least one of (i) information indicating whether the tune can be permitted to be copied or not; (ii) the number of times that the tune is permitted to be copied; (iii) the quality at which the tune is permitted to be copied (for example, the maximum bit rate at which the tune is permitted to be copied); and (iv) copy destination designation information which designates the information recording medium or system to which the tune is permitted to be copied. The copy management information 347 may include, recorded therein, transfer permission information, check-in/out permission information, and the number of times that the check-out is permitted. The term "transfer" refers to that when a tune recorded on one information recording medium is copied to another information recording medium, the tune is deleted from the information recording medium from which the tune is copied. The term "check-in/out" refers to managing the copying of a content using copying means referred to as "check-out" and copying means referred to as "check-in". The term "check-out" refers to that when a tune copied to another information recording medium is copied to still another information recording medium, the counter value recorded in the information recording medium, from which the tune was first copied, is decremented by one. The initial counter value is designated by the number of times that the check-out is permitted. When the counter value becomes 0, the check-out is not permitted any more. The term "check-in" refers to that the tune, for which check-out was performed, is deleted from the another information recording medium or the still another information recording medium, and the counter value in the information recording medium, from which the tune was copied, is incremented by one.

The reproduction restriction information 348 indicates, for example, the number of times that the tune is permitted to be reproduced, the date by which the tune is permitted to be reproduced, the time period in which the tune is permitted to be reproduced, a portion of a tune which can be reproduced, password information for reproduction, reproduction permission district information which indicates the countries and districts in which reproduction is permitted, and the number of reproduction apparatuses which can reproduce the tune simultaneously.

The encryption system may be included in the second audio data file information or second tune copyright management information.

According to the data structure shown in FIGS. 4A and 4B, even when second tune information manages a plurality of second audio data files, the same copyright management information is applied to all the plurality of second audio data files. The present invention is applicable to a data structure in which different copyright management information is applied to each of the second plurality of second audio data files managed by the second tune information. One example will be described below.

Figure 7A:
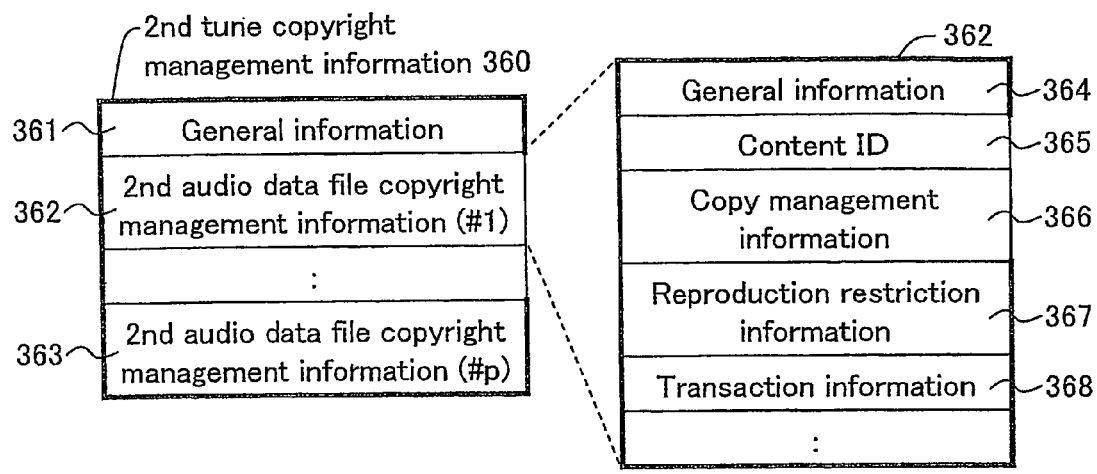
FIG. 7A shows second tune copyright management information according to an example of the present invention.

FIG. 7A shows second tune copyright management information 360 for performing file-by-file copyright management. The second tune copyright management information 360 includes general information 361, and second audio data file copyright management information 362 and 363. Each of the second audio data file copyright management information 362 and 363 manages the copyright of the corresponding tune. Each of the second audio data file copyright management information 362 and 363 includes general information 364, a content ID 365, copyright information 366, reproduction restriction information 367, and transaction information 368. The copyright of each audio data file can be independently managed using the second tune copyright management information 360.

The order by which the second tune copyright management information shown in FIG. 7A is recorded is the same as the order by which the second audio data file information shown in FIG. 4A is recorded. Namely, the copyright management information of the audio data managed by the second audio data file information (#1) is included in the second audio data file copyright management information (#1).

Figure 7B:
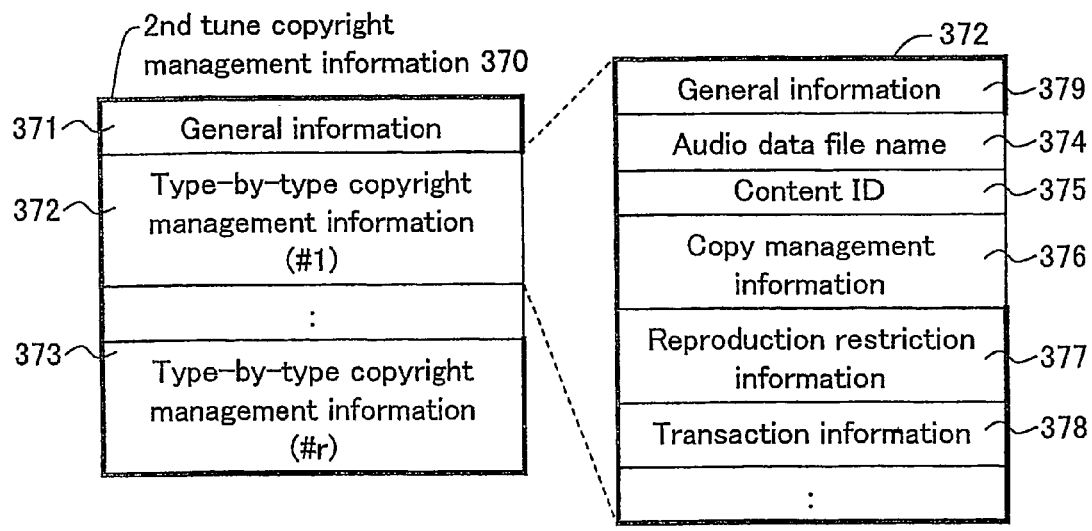
FIG. 7B shows second tune copyright management information according to an example of the present invention.

FIG. 7B shows second tune copyright management information 370 for performing type-by-type copyright management. The second tune copyright management information 370 includes general information 379, and type-by-type copyright management information 372 and 373. Each of the type-by-type copyright management information 372 and 373 includes general information 373, an audio data file name 374, a content ID 375, copyright information 376, reproduction restriction information 377, and transaction information 378.

By the type-by-type copyright management, necessary types of copyright management information are included in the second tune copyright management information 370. Specifically, second tune copyright management information includes at least one piece of type-by-type copyright management information, and each piece of type-by-type copyright management information includes specific copyright management information and a file name of the second audio data file to which the copyright management information is to be applied.

Owing to this, the copyright management information is applied to each audio data file. Thus, reproduction, copying or other conditions can be defined in various manners. An audio data file to be used for reproduction or copying can be selected in accordance with the various conditions.

Figure 9:
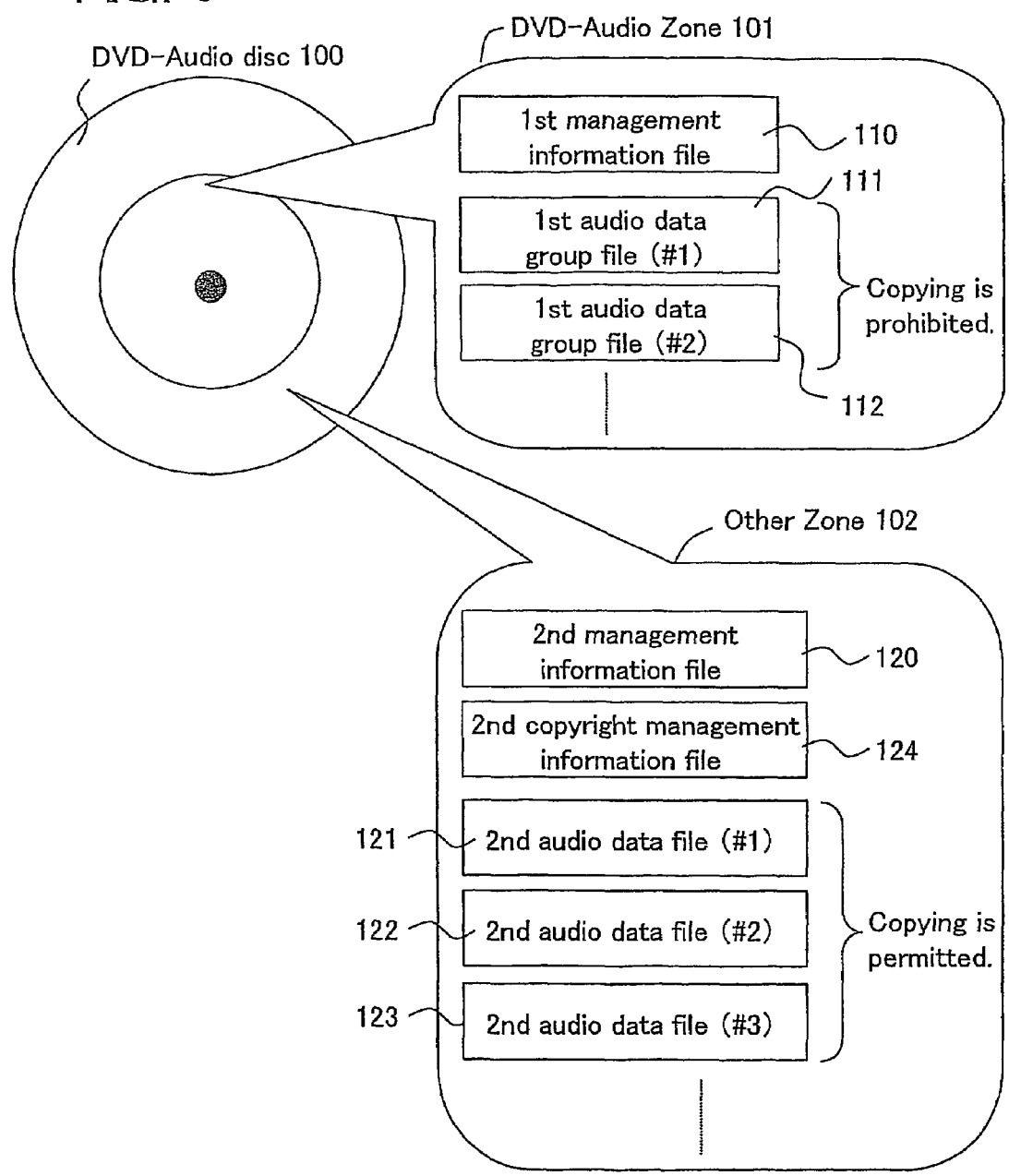
FIG. 9 shows an application of different copyright management information according to an example of the present invention.

According to the present invention, an information recording medium is divided into a plurality of (for example, two) areas. Second copyright management information which is independent from first copyright management information is used for a second audio data file. Even if, for example, as shown in FIG. 9, a tune recorded in the DVD-Audio Zone 101 is prohibited from being copied, a tune recorded in the Other Zone 102 may be defined as being permitted to be copied. For example, in the case where the tune recorded in the DVD-Audio Zone 101 is of high quality, a music company may set that tune as being prohibited from being copied since the company does not want such a high quality tune to be copied. However, it is inconvenient for a user that a tune cannot be copied from a DVD-Audio Disc 100. Accordingly, the tune recorded in the DVD-Audio Zone 101 is compressed to lower the quality of the tune and such a lower quality tune is recorded in the Other Zone 102. As long as the music company allows the user to copy the audio data recorded in the Other Zone 102, the problem of the inconvenience to the user does not occur.

When different copyright management information is applied to the tune in the DVD-Audio Zone 101 and to the tune in the Other Zone 102, the first audio data group file and the second audio data file are encrypted by different encryption systems, for the following reason. If the tune in the DVD-Audio Zone 101 and the tune in the Other Zone 102 are encrypted by the same encryption system, a party which is licensed to decrypt only the tune in the Other Zone 102 for reproduction can also decrypt the tune in the DVD-Audio Zone 101 using the same decryption system. Thus, the tune in the DVD-Audio Zone 101 may possibly be reproduced or copied illegally. In order to avoid such a situation, the tune in the DVD-Audio Zone 101 and the tune in the Other Zone 102 are encrypted by different encryption systems. It is not necessary that the two encryption systems are totally different; an encryption algorithm of a first encryption system and an encryption algorithm of a second encryption system may be partially the same. It is rather preferable that the algorithms are partially the same, since it is not necessary to mount two totally different decryption systems on the reproduction apparatus and thus the mounting load is alleviated. The first encryption system and the second encryption system may include encryption processing using common information. For example, an encryption key or a decryption key, or encryption key generation information or decryption generation information for generating the respective key may be shared by the encryption system and the decryption system used for the DVD-Audio Zone 101 and the encryption system and the decryption system used for the Other Zone 102.

Copy-free tunes may or may not be encrypted.

First audio data indicating a tune recorded in the DVD-Audio Zone 101 may be non-compressed information or reversibly compressed information. In the case where the first audio data is non-compressed data, the second audio data file indicating the tune recorded in the Other Zone 102 may be information obtained by reversibly compressing the first audio data. In the case where the first audio data is reversibly compressed information, the second audio data file indicating the tune recorded in the Other Zone 102 may be information obtained by irreversibly compressing non-compressed information, which is generated by decoding the first audio data.

In the Other Zone 102, a plurality of pieces of management information for managing handling of the second audio data files may be recorded. In the example shown in FIG. 10, in the Other Zone 102, the second management information file 120 which is necessarily recorded, and third management information files 530 and 540 which are other management information, are recorded. In this example, the second management information file 120 includes information regarding third management information. Second management information 620 shown in FIG. 11, which is an example of the second management information, includes information included in the second management information 320 (FIG. 2) and third management information related information 622 and 623 regarding the third management information. Each of the third management information related information 622 and 623 includes a file name 624 of the corresponding third management information. Each of the third management information related information 622 and 623 is used as link information indicating the third management information related to the second management information. The third management information may have any data structure, and the third management information does not need to include link information indicating linking between the second audio data file and the tune recorded in the first audio data group file.

Figure 10:
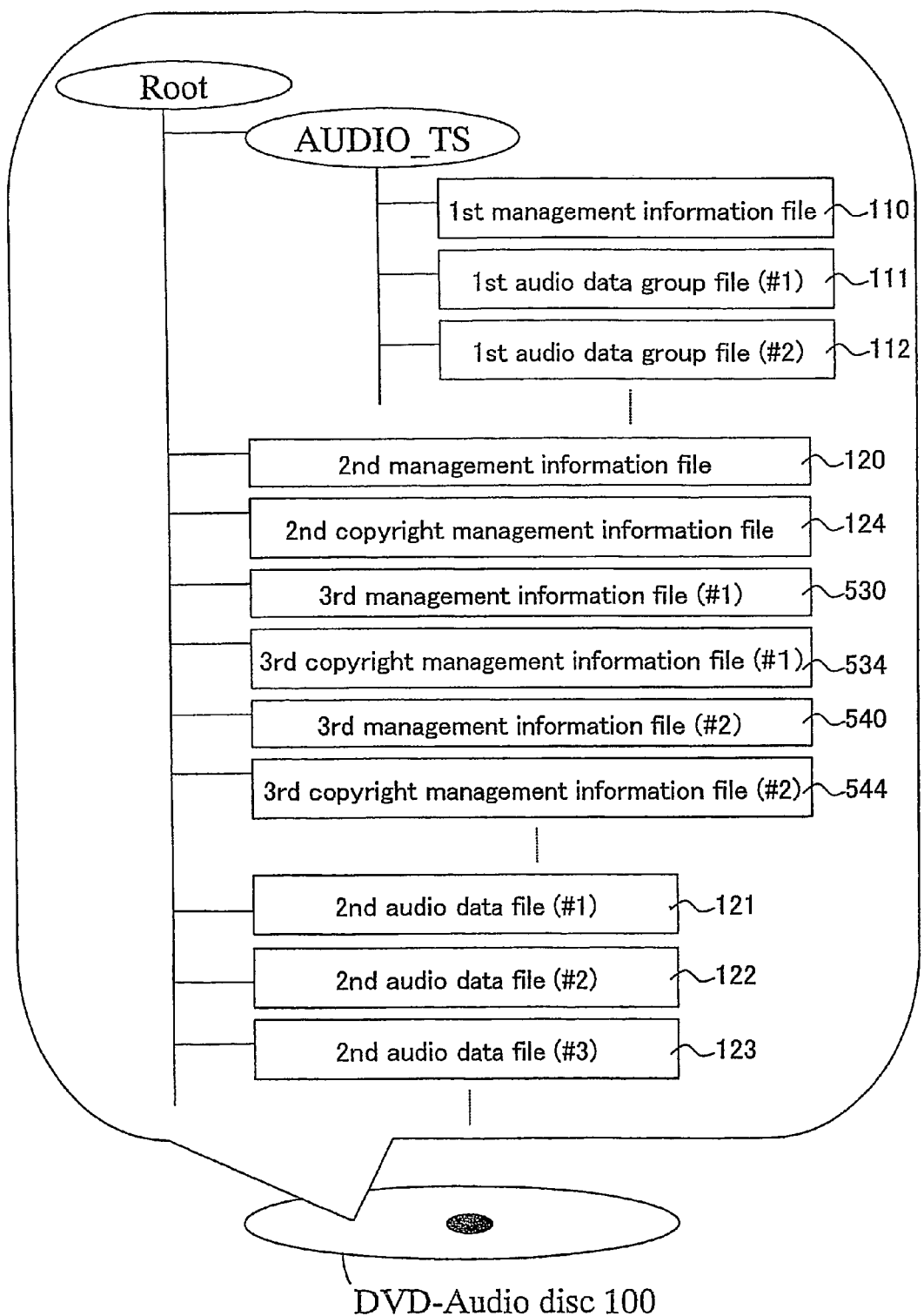
FIG. 10 shows a file structure of an information recording medium according to an example of the present invention.
Figure 11:
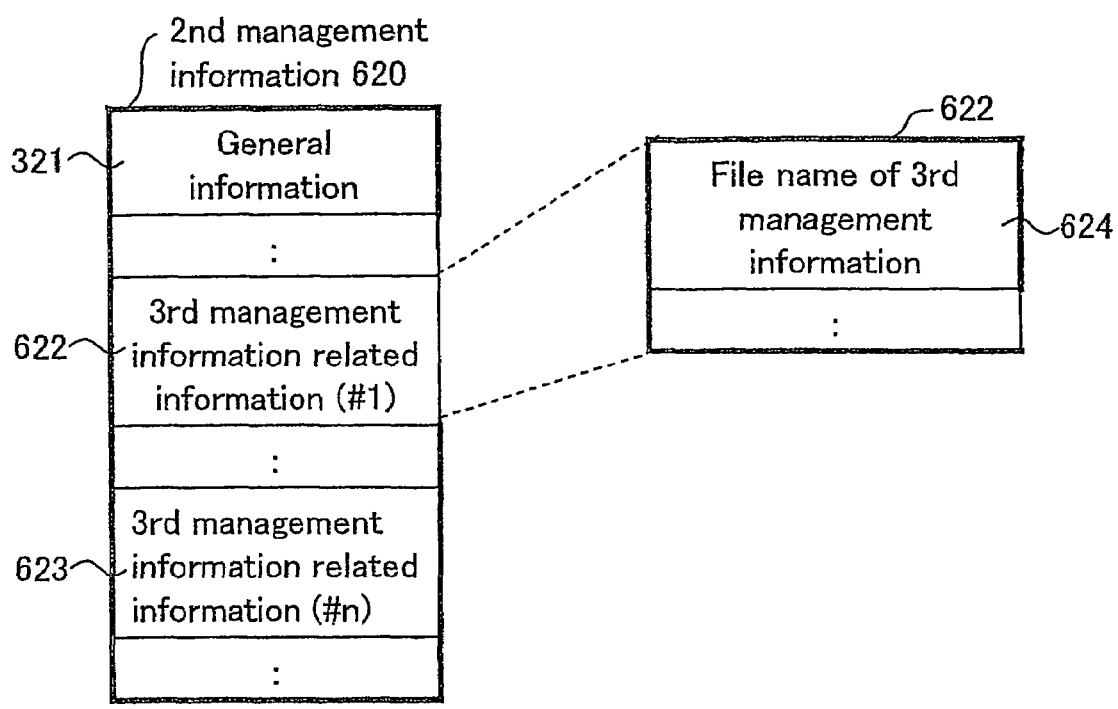
FIG. 11 shows a data structure of second management information according to an example of the present invention.

The Other Zone 102 shown in FIG. 10 includes, recorded therein, third copyright management information 534 corresponding to a third management information file 530 and third copyright management information 544 corresponding to a third management information file 540. When a plurality of management information files are recorded in the Other Zone 102 like this, third copyright management information files corresponding the third management information files respectively are recorded. Each of the third copyright management information 534 and 544 is information regarding the copyright of each of the second audio data files which are independent from both of the second copyright management information 114 and 340. The third copyright management information 534 and 544 can apply a copyright, different from the copyright in the first and second copyright management information 114 and 340, to the second audio data files.

In the case where a plurality of third management information files can share one piece of third copyright management information, it is not necessary to record a plurality of third copyright management information files. In the case where all the third management information files can share the same content with a second copyright management information file, it is not necessary to record the third copyright management information files.

According to the present invention, a plurality of pieces of management information is recorded in the Other Zone 102. Owing to such a structure, the data in the DVD-Audio disc 100 can be reproduced by a larger number of reproduction apparatuses. For example, there are reproduction apparatuses already marketed today which cannot reproduce a tune recorded in the DVD-Audio Zone 101. By recording management information which can be decrypted by such reproduction apparatuses in the Other Zone 102 of the DVD-Audio disc 100, such reproduction apparatuses can reproduce the data recorded in the DVD-Audio disc 100. By recording third management information which does not have link information to the DVD-Audio Zone 101 in the Other Zone 102 of the DVD-Audio disc 100, the reproduction apparatuses for decrypting only the third management information can have a simplified structure since it is not necessary to interpret the data structure of the DVD-Audio disc 100. For using such reproduction apparatuses, it is not necessary to obtain a license regarding DVD-Audio standards, which solves the problem of high costs for obtaining the license.

The second management information may include information regarding a synchronous reproduction management information file for managing handling of synchronous reproduction information which is reproduced in synchronization with a second audio data file. Thus, the second audio data and the synchronous reproduction information can be reproduced in synchronization with each other. For example, it is made possible to display still pictures related to each other, such as those of a slide show, while the audio data is being reproduced.

Figure 12:
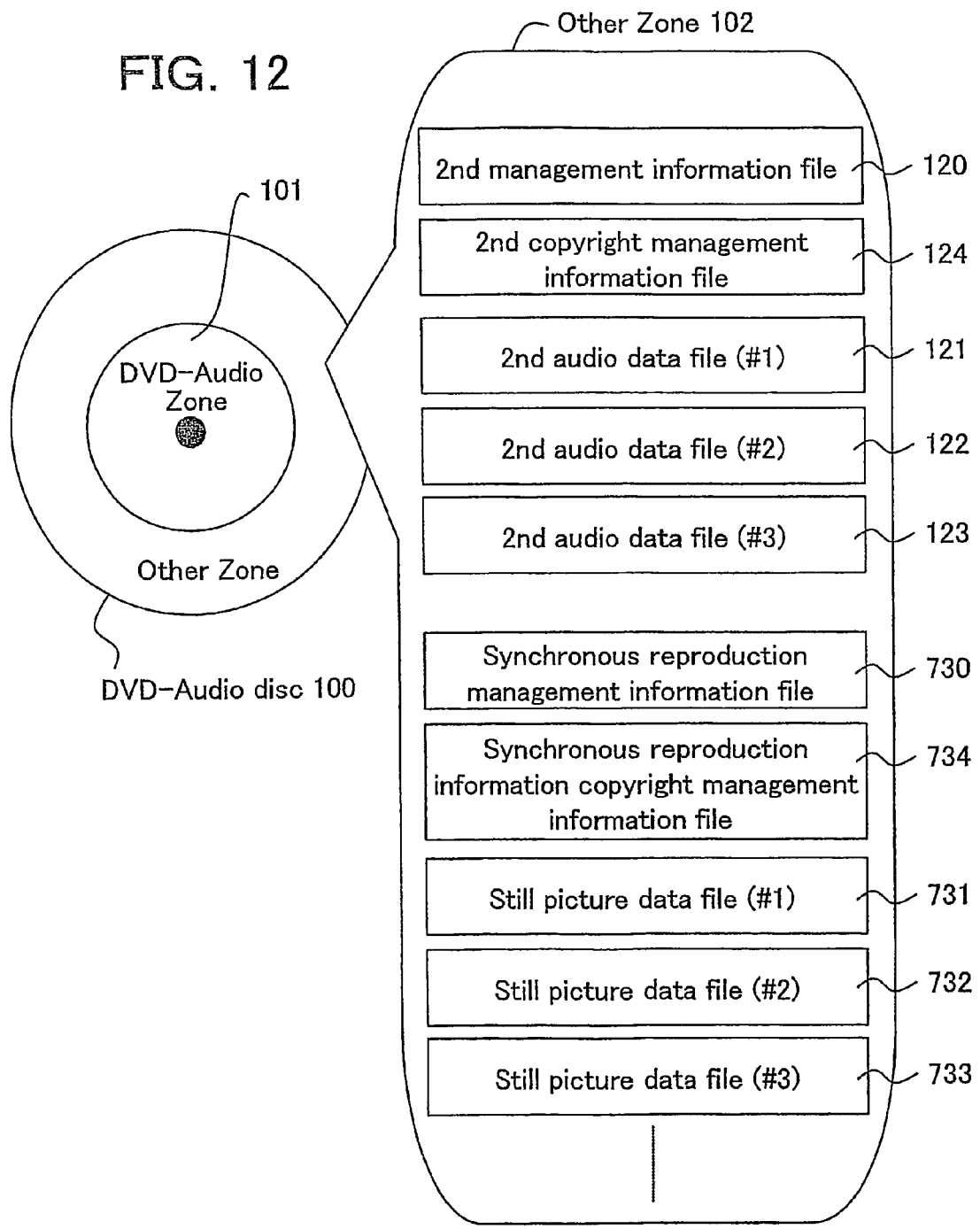
FIG. 12 shows an information recording medium including synchronous reproduction management information according to an example of the present invention.
Figure 13:
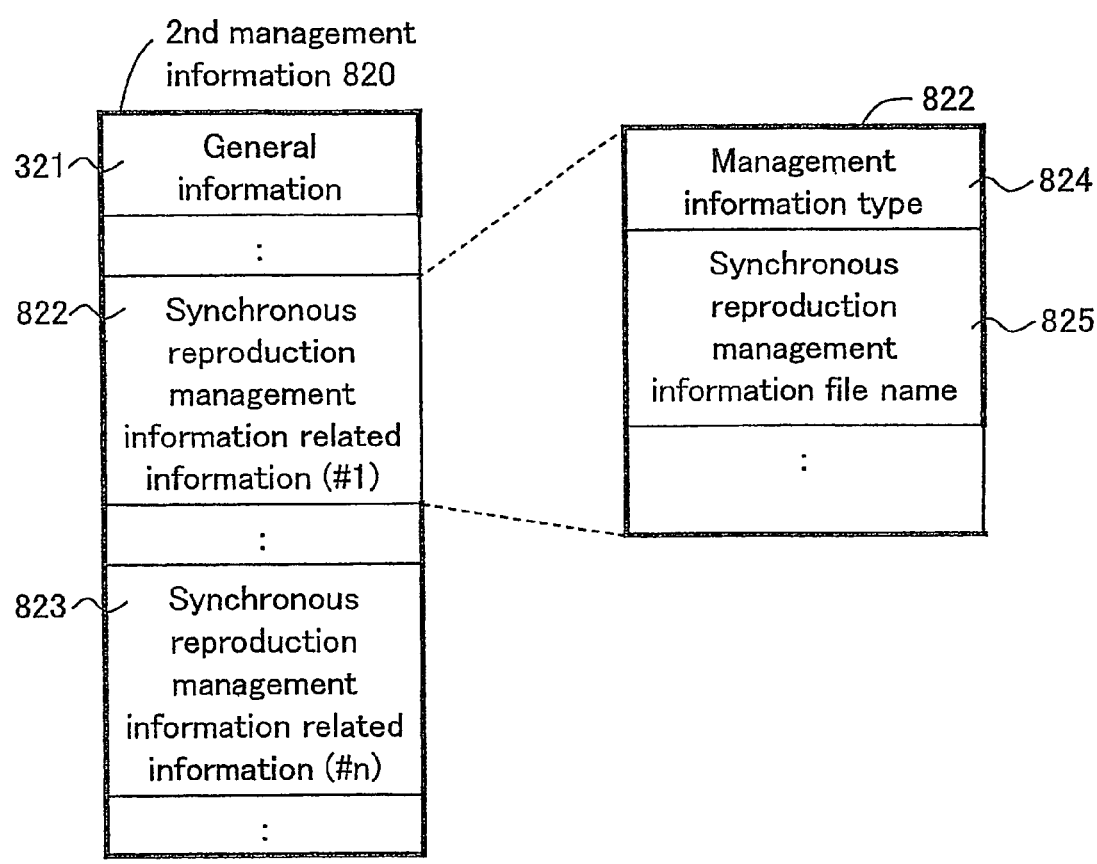
FIG. 13 shows synchronous reproduction management information related information according to an example of the present invention.

The Other Zone 102 shown in FIG. 12 includes still picture data files 731, 732 and 733, which are synchronous reproduction information, a synchronous reproduction information copyright management information file 734 for managing the copyright of each of the still picture data files 731, 732 and 733, and a synchronous reproduction management information file 730 for managing the display method of the still pictures respectively represented by the still picture data files 731, 732 and 733. In this example, second management information 820 shown in FIG. 13 includes synchronous reproduction management information related information 822 and 823. Each of the synchronous reproduction management information related information 822 and 823 includes a synchronous reproduction management information file name 825 and management information type 824 indicating the type of the corresponding synchronous reproduction management information. Each of the synchronous reproduction management information related information 822 and 823 is used as link information indicating that the second management information is related to the synchronous reproduction management information file.

The management information type 824 is mainly used for determining whether or not the reproduction apparatus can decrypt the synchronous reproduction management information. The synchronous reproduction management information file 825 is used for searching for the corresponding file. However, it is not necessary to refer to the synchronous reproduction management information file 825 in order to search for the file, in the case where the file name of a synchronous reproduction management information file is determined in accordance with a certain rule. In this case, the synchronous reproduction management information related information may or may not be included in the second management information.

Figure 14:
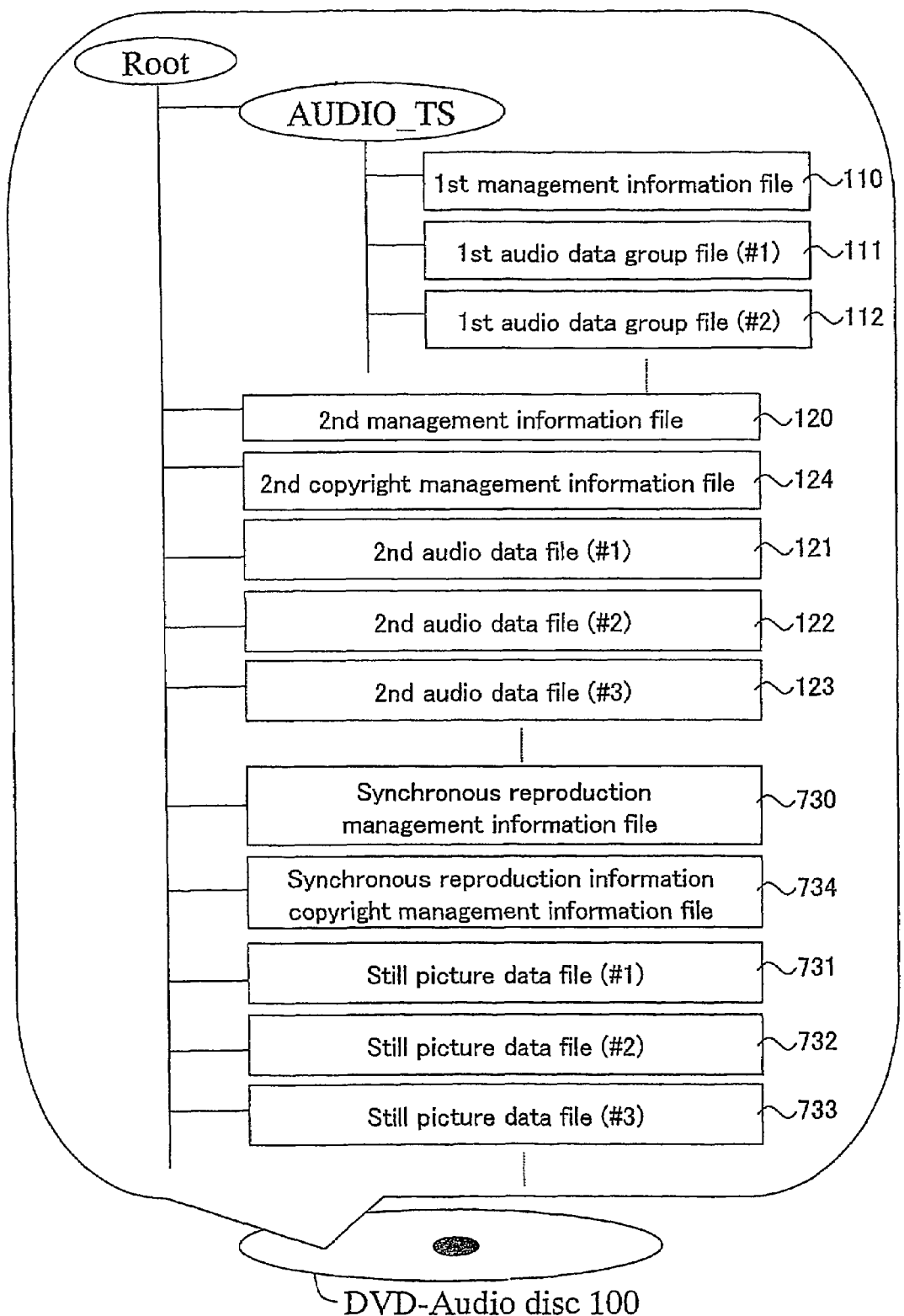
FIG. 14 shows a file structure of an information recording medium including synchronous reproduction management information according to an example of the present invention.

In the example shown in FIG. 12, it is assumed that while a second audio data file provided with a certain serial number (for example, #1) is being reproduced, a still picture data file provided with the same serial number is reproduced. The present invention is not limited to such a form. All the still picture data may be recorded in one file. The synchronous reproduction management information file 730 and the synchronous reproduction information copyright management information file 734 may have any data structure. As shown in FIG. 14, the synchronous reproduction management information file 730, the synchronous reproduction information copyright management information file 734, and the still picture data files 731 through 733 may be recorded in the same directory with the second management information file, the second copyright management information file, and the second audio data file, or may be recorded in a different directory from these files. The synchronous reproduction information copyright management information file 734 may be included in the synchronous reproduction management information file 730. The data managed by the synchronous reproduction management information file 730 may not be still picture data, but may be audio information, moving picture information, text information or the like. A plurality of pieces of synchronous reproduction management information may be recorded.

According to the present invention, moving picture information, still picture information, text information or the like may be recorded on the DVD-Audio disc 100, instead of the audio data included in each of the first audio data group files and the second audio data files. The second management information and the second copyright management information may be recorded in different files from each other or may be recorded in one file. In the case where the second management information and the second copyright management information are recorded in one file, the second copyright management information may be added to the end of the second management information, or each piece of second tune copyright management information may be recorded in the corresponding second tune information.

Similarly, the third management information and the corresponding third copyright management information may be recorded in different files from each other or may be recorded in one file. The second management information and the third management information may be recorded in one file, and the second copyright management information and the third copyright management information may be recorded in one file. In this case, the third management information related information shown in FIG. 11 indicates the leading address of the third management information.

Alternatively, all the management information and all the copyright management information may be recorded in one file. In the case where a plurality of pieces of management information and a plurality of pieces of copyright management information are recorded in one file, the file includes information indicating the leading address of each piece of management information or each piece of copyright management information. The plurality of pieces of audio data recorded in Other Zone 102 may be recorded in different second audio data files respectively, or may all be recorded in one file. Alternatively, audio data managed by each piece of second tune management information may be recorded in one file. Still alternatively, audio data managed by each piece of management information may be recorded in one file. In the case where a plurality of pieces of audio data are recorded in one file, as the file name included in the second audio data file information shown in FIG. 4A, the recording start address and the recording end address of the corresponding audio data are recorded. By recording a plurality of pieces of information or a plurality of pieces of copyright management in a small number of files, the number of times that the reproduction apparatus accesses the files is reduced. Thus, the time period for which the user needs to wait until the start of reproduction or copying is shortened.

The Other Zone 102 in this example means an area of the DVD-Audio disc 100 other than an Audio_TS directory. In this example, the DVD-Audio disc 100 is described as an example. The present invention is applicable to other information recording mediums and applications. For example, the present invention is applicable to CDs, Blue Ray discs, HD-DVDs (High Density DVDs), hard discs, semiconductor memories, and the like.

According to the present invention, an information recording medium is divided into two or more areas, and different copyright management information can be applied to content recorded in each area. Link information indicating the linking between the contents recorded in different areas can be recorded. Thus, it is easy to search for a certain content recorded in one area based on another content linked with the certain content.

Example 2

Figure 15:
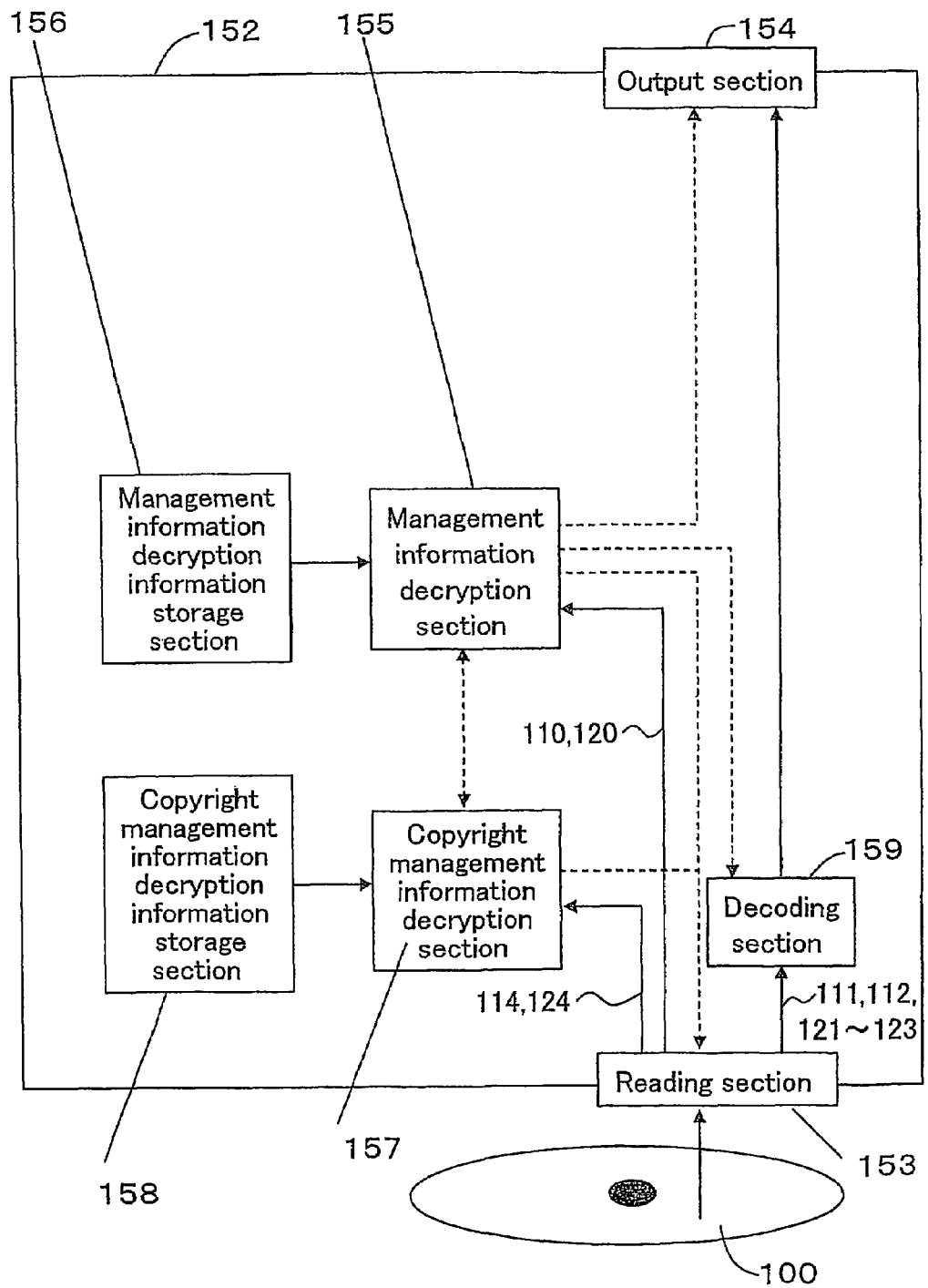
FIG. 15 shows a reproduction apparatus according to an example of the present invention.

FIG. 15 shows a reproduction apparatus 152 according to a second example of the present invention. The reproduction apparatus 152 reproduces a tune recorded in an information recording medium. The information recording medium is, for example, the DVD-Audio disc 100 but is not limited to this.

The reproduction apparatus 152 includes a reading section 153, an output section 154, a management information decryption section 155, a management information decryption information storage section 156, a copyright management information decryption section 157, a copyright management information decryption information storage section 158, and a decoding section 159.

The reading section 153 reads information (audio data, management information, etc.) recorded on the DVD-Audio disc 100. The decoding section 159 decodes the audio data read by the reading section 153, and the output section 154 outputs the audio data decoded by the output section 154.

Figure 16A:
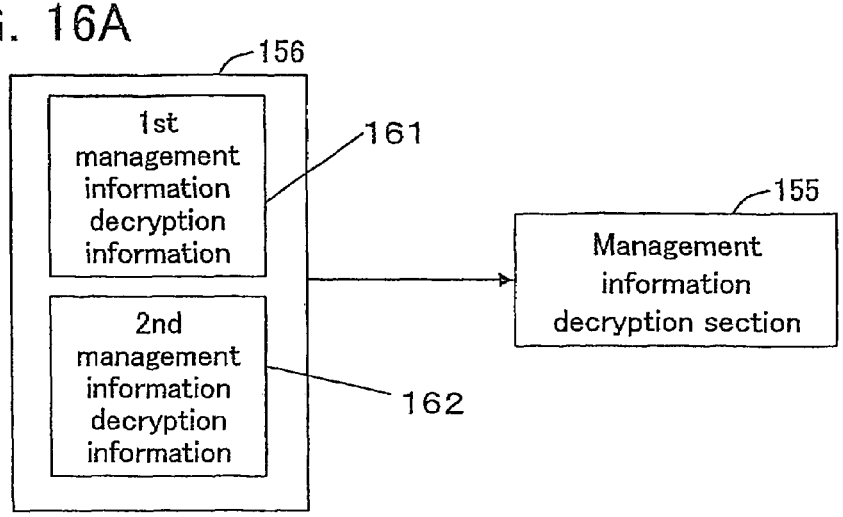
FIG. 16A shows details of the reproduction apparatus shown in FIG. 15.

As shown in FIG. 16A, the management information decryption information storage section 156 stores at least one of (i) first management information decryption information 161 for decrypting the contents of the first management information file 110 and (ii) second management information decryption information 162 for decrypting the contents of the second management information file 120. The management information decryption section 155 uses the first management information decryption information 161 to decrypt the contents of the first management information file 110. The management information decryption section 155 uses the second management information decryption information 162 to decrypt the contents of the second management information file 120. The management information decryption section 155 controls the operation of the recording section 153, the decoding section 159 and the output section 154 in accordance with the decryption result.

Figure 16B:
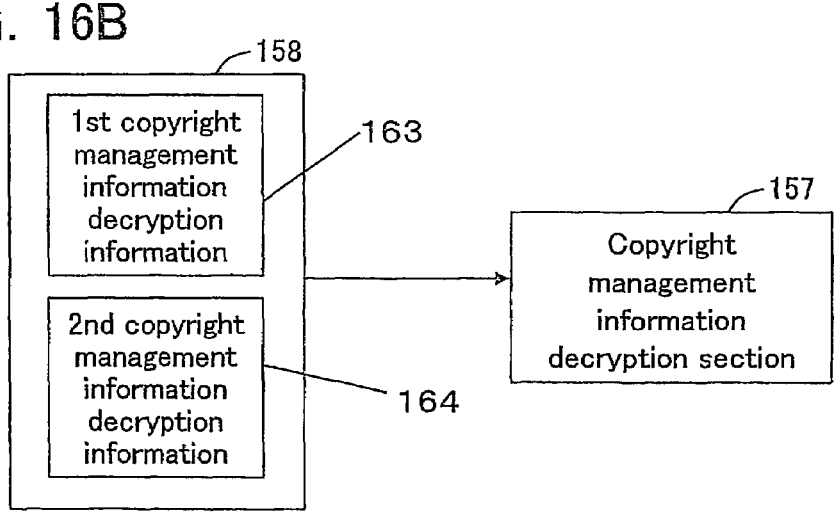
FIG. 16B shows details of the reproduction apparatus shown in FIG. 15.

As shown in FIG. 16B, the copyright management information decryption information storage section 158 includes at least one of (i) first copyright management information decryption information 163 for decrypting the contents of the first copyright management information 114 and (ii) second copyright management information decryption information 164 for decrypting the contents of the second copyright management information 124. The copyright management information decryption section 157 uses the first copyright management information decryption information 163 to decrypt the contents of the first copyright management information 114. The copyright management information decryption section 157 uses the second copyright management information decryption information 164 to decrypt the contents of the second copyright management information file 124.

Figure 16C:
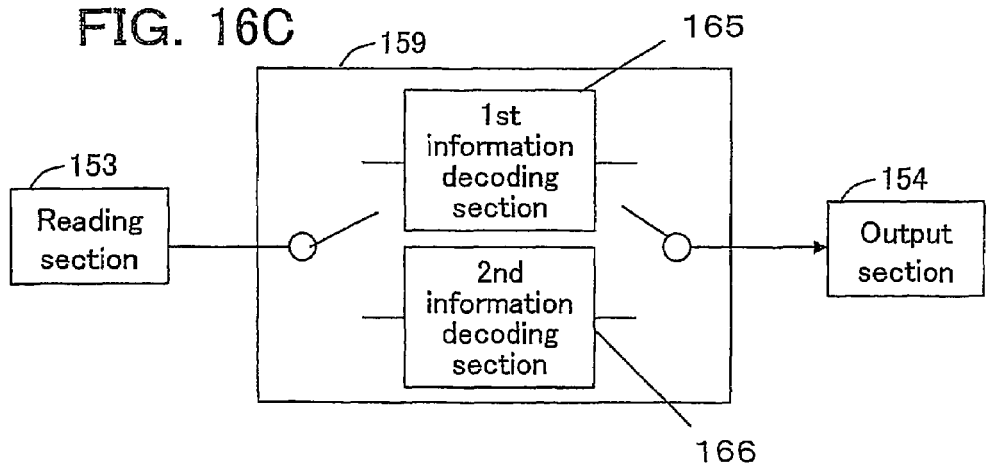
FIG. 16C shows details of the reproduction apparatus shown in FIG. 15.

As shown in FIG. 16C, the decoding section 159 includes at least one of a first information decoding section 165 and a second information decoding section 166. The first information decoding section 165 decodes audio data which is recorded in the DVD-Audio Zone 101 and encrypted by the first encryption system. The second information decoding section 166 decodes audio data recorded in the Other Zone 102 and encrypted by the second encryption system. The decoding section 159 may be included in the output section 154.

In the case where the management information decryption information storage section 156 includes the first management information decryption information 161, the copyright management information decryption information storage section 158 necessarily stores the first copyright management information decryption information 163, and the decoding section 159 necessarily includes the first information decoding section 165. Similarly, in the case where the management information decryption information storage section 156 includes the second management information decryption information 162, the copyright management information decryption information storage section 158 necessarily stores the second copyright management information decryption information 164, and the decoding section 159 necessarily includes the second information decoding section 166.

With reference to the flowchart in FIG. 17, an operation of the reproduction apparatus 152 to reproduce the data in the DVD-Audio disc 100 will be described. When the DVD-Audio disc 100 is inserted into the reproduction apparatus 152 (S801), management information to be read is specified (S802). In the case where the reproduction apparatus 152 can decrypt the first management information file and reproduces the first audio data group file, the following operations are performed in S803. The first management information file and the first copyright management information are read by the reading section 153, the first management information file is output to the management information decryption section 155, and the first copyright management information is output to the copyright management information decryption section 157. In the case where the reproduction apparatus 152 cannot decrypt the second management information file, S803 is performed.

The copyright management information decryption section 157 uses the first copyright management information decryption information 163 to decrypt the first copyright management information and determines whether the tune to be reproduced is permitted to be reproduced or not (S804). When it is determined that the tune to be reproduced is prohibited from being reproduced, the reproduction operation is stopped (S813). When it is determined that the tune to be reproduced is permitted to be reproduced, the management information decryption section 155 uses the first management information decryption information 161 to decrypt the first management information file. The reading section 153 reads the audio data of the tune to be reproduced based on the decryption result (S805), and outputs the audio data to the decoding section 159. The first information decoding section 165 of the decoding section 159 decodes the encrypted audio data (S806), and the output section 154 outputs the decoded audio data (S807). Thus, the audio data is reproduced.

In the case where the reproduction apparatus 152 can decrypt only the second management information (i.e., cannot decrypt the first management information), or in the case where the reproduction apparatus 152 is to reproduce the second audio data file, the reading section 153 reads the second management information and the second copyright management information, and the audio data is reproduced in the same manner as described above (S803 through 807 and 813). The operations performed in S808 through S813 are substantially the same as those of S803 through S807 and S813 except for the information treated, and will not be described in detail here.

In the case where the reproduction apparatus 152 can decrypt both the first management information file and the second management information, either the first management information file or the second management information file is decrypted in accordance with the reproduction conditions.

Figure 18:
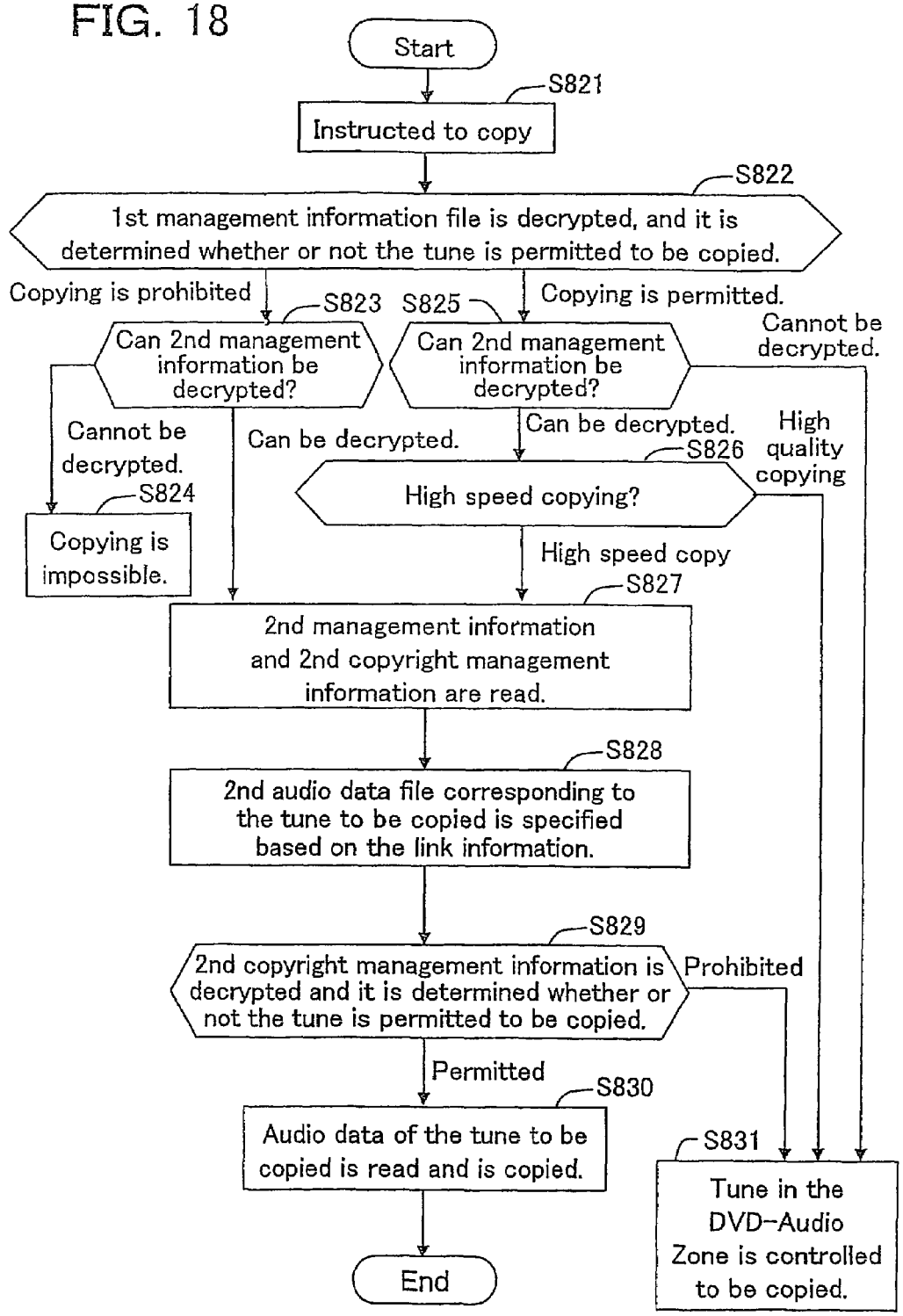
FIG. 18 is a flowchart for copying a tune by the reproduction apparatus shown in FIG. 15.

Next, an operation of the reproduction apparatus 152 for copying a tune recorded in the DVD-Audio Zone 101 will be described with respect to the flowchart in FIG. 18.

While the reproduction apparatus 152 is reproducing a tune recorded in the DVD-Audio Zone 101 or displaying a menu screen after reading the first management information file, the user instructs the reproduction apparatus 152 to copy a tune recorded in the DVD-Audio Zone 101 (S821). In this case, the reproduction apparatus 152 decrypts the first copyright management information and determines whether or not the tune is permitted to be copied (S822). In the case where the tune is permitted to be copied and the reproduction apparatus 152 can decrypt the second management information, the user is allowed to select whether he/she wishes the tune to be copied at high speed or at high quality (S825 and S826). In the case where the user selects high speed copying, the reading section 153 reads the second management information and the second copyright management information (S827), outputs the second management information to the management information decryption section 155, and outputs the second copyright management information to the copyright management information decryption section 157. In the case where the user selects high quality copying, the reproduction apparatus 152 operates to copy the tune recorded in the DVD-Audio Zone 101 (S831).

Figure 6:
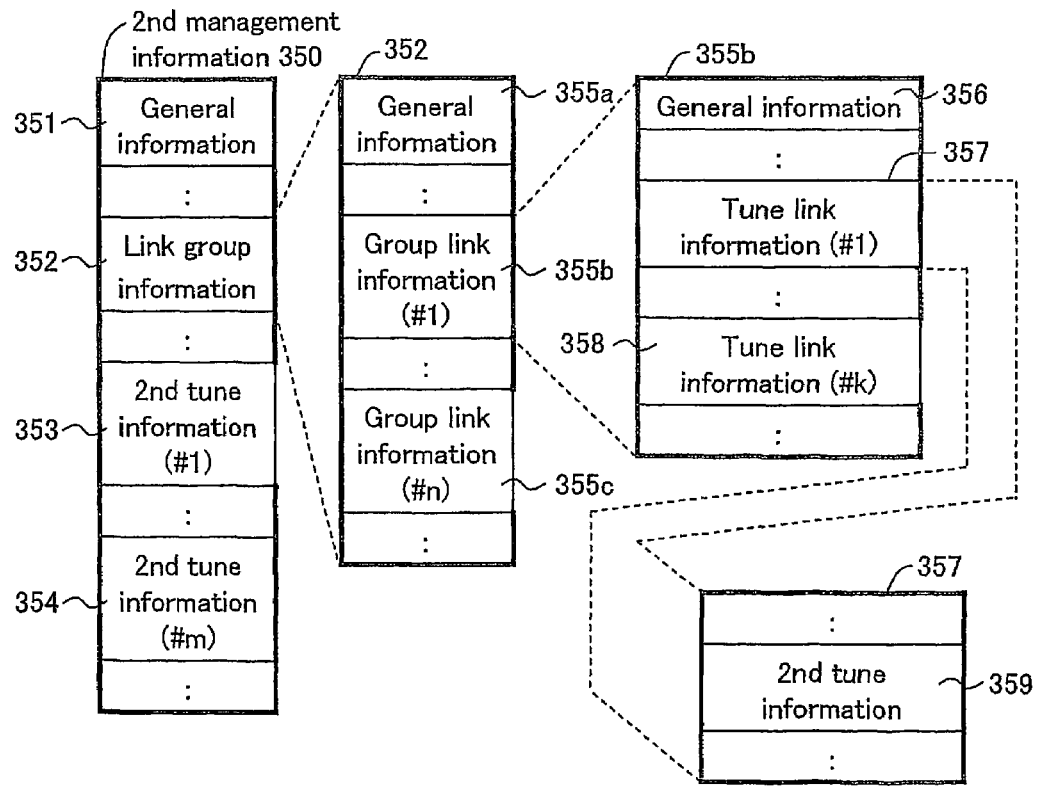
FIG. 6 shows link group information according to an example of the present invention.

The management information decryption section 155 uses the second management information decryption information 162 to decrypt the second management information. At this point, the second tune information is searched for based on the link information. For example, in the case where the group numbers and the track numbers of tunes are recorded as the link information, the second tune information including the group number and the track number to be copied is searched for. When other information is recorded as the link information, the second tune information including that information is searched for. In the case where the second management information includes the link group information as shown in FIG. 6, the tune link information corresponding to the tune to be copied is searched for, and the second tune information is specified from the number of the second tune indicated by the tune link information which has been found by the search (S828). Once the corresponding second tune information is specified, the copyright management information decryption section 157 determines whether or not the audio data file managed by the specified second tune information is permitted to be copied (S829).

When it is determined that the audio data file is permitted to be copied, the reading section 153 reads the file having the file name indicated by the second audio data file information, and outputs the read file to the decoding section 159. The second information decoding section 166 of the decoding section 159 decodes the read audio data, and the output section 154 outputs the decoded audio data to be copied (S830). When it is determined that the audio data file is prohibited from being copied, the reproduction apparatus 152 operates the tune recorded in the DVD-Audio Zone 101 (S831).

In the case where the tune recorded in the DVD-Audio Zone 101 is permitted to be copied and the reproduction apparatus 152 cannot decrypt the second management information, or in the case where the user does not select high speed copying, the reproduction apparatus 152 operates to copy the tune recorded in the DVD-Audio Zone 101. Specifically, the reading section 153 reads the audio data corresponding to the tune from the information recording medium, and outputs the audio data to the decoding section 159. The first information decoding section 165 of the decoding section 159 decodes the read audio data, and outputs the audio data to the output section 154 to be copied.

In the case where the tune recorded in the DVD-Audio Zone 101 is prohibited from being copied and the reproduction apparatus 152 can decrypt the second management information, the reproduction apparatus 152 operates to copy the second audio data (S823 and S827 through S830). In this case, the operation in S831 is not performed. In the case where the reproduction apparatus 152 cannot decrypt the second management information, the tune cannot be copied (S824).

According to the present invention, a tune recorded in the DVD-Audio Zone 101 and a tune recorded in the Other Zone 102 are provided with different pieces of copyright management information. For example, it is possible that the tune recorded in the DVD-Audio Zone 101 is prohibited from being copied since it is of high quality, whereas the tune recorded in the Other Zone 102 is permitted to be copied since it is compressed. In this case, even if the user instructs the reproduction apparatus 152 to copy the tune recorded in the DVD-Audio Zone 101, the reproduction apparatus 152 according to the present invention automatically searches for the corresponding tune from the Other Zone 102 to be copied.

In the case where both a tune recorded in the DVD-Audio Zone 101 and a tune recorded in the Other Zone 102 in a compressed form are permitted to be copied, the time required for copying can be shorter when the tune recorded in the Other Zone 102 is selected than when the tune recorded in the DVD-Audio Zone 101 is selected. The reason is the data amount of the tune recorded in the Other Zone 102 is smaller.

Figure 19:
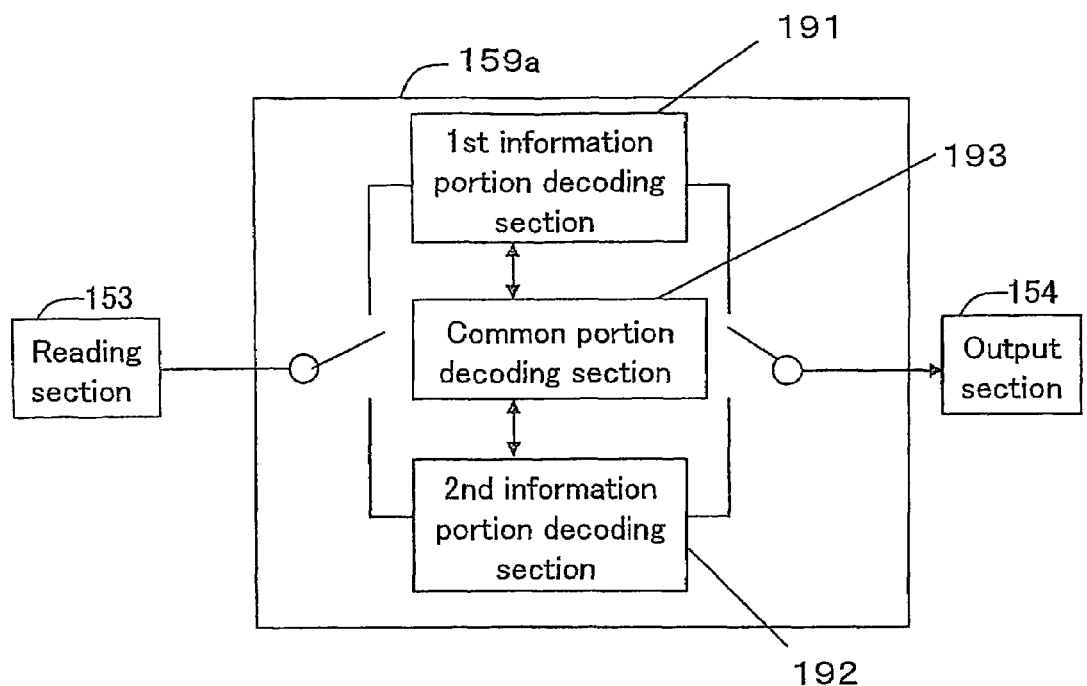
FIG. 19 shows a decoding section of the reproduction apparatus shown in FIG. 15.

As described above, the decoding section 159 includes the first information decoding section 165 and the second information decoding section 166. In the case where the first information decoding section 165 and the second information decoding section 166 use decoding algorithms which are partially the same as each other, a decoding section 159a as shown in FIG. 19 may be used. The decoding section 159a includes a first information portion decoding section 191, a second information portion decoding section 192, and a common portion decoding section 193.

The common portion decoding section 193 decodes a portion of the audio data recorded in the DVD-Audio Zone 101 and a portion of the audio data recorded in the Other Zone 102, the portions being encrypted using the same algorithm. The first information portion decoding section 191 decodes a portion of the audio data recorded in the DVD-Audio Zone 101, the portion being encrypted by the algorithm which uses the first encryption system but does not use the second encryption system. The second information portion decoding section 192 decodes a portion of the audio data recorded in the Other Zone 102, the portion being encrypted by the algorithm which uses the second encryption system but does not use the first encryption system.

When the audio data recorded in the DVD-Audio Zone 101 is input to the decoding section 159a, the first information portion decoding section 191 starts decoding, and when necessary, the common portion decoding section 193 performs decoding. The audio data finally obtained in this manner is output to the output section 154. Similarly, when the audio data recorded in the Other Zone 102 is input to the decoding section 159a, the second information portion decoding section 192 starts decoding, and when necessary, the common portion decoding section 193 performs decoding. The audio data finally obtained in this manner is output to the output section 154. Thus, it is not necessary to implement a plurality of identical decoding algorithms, which alleviates the implementing load on the reproduction apparatus 152.

Figure 20:
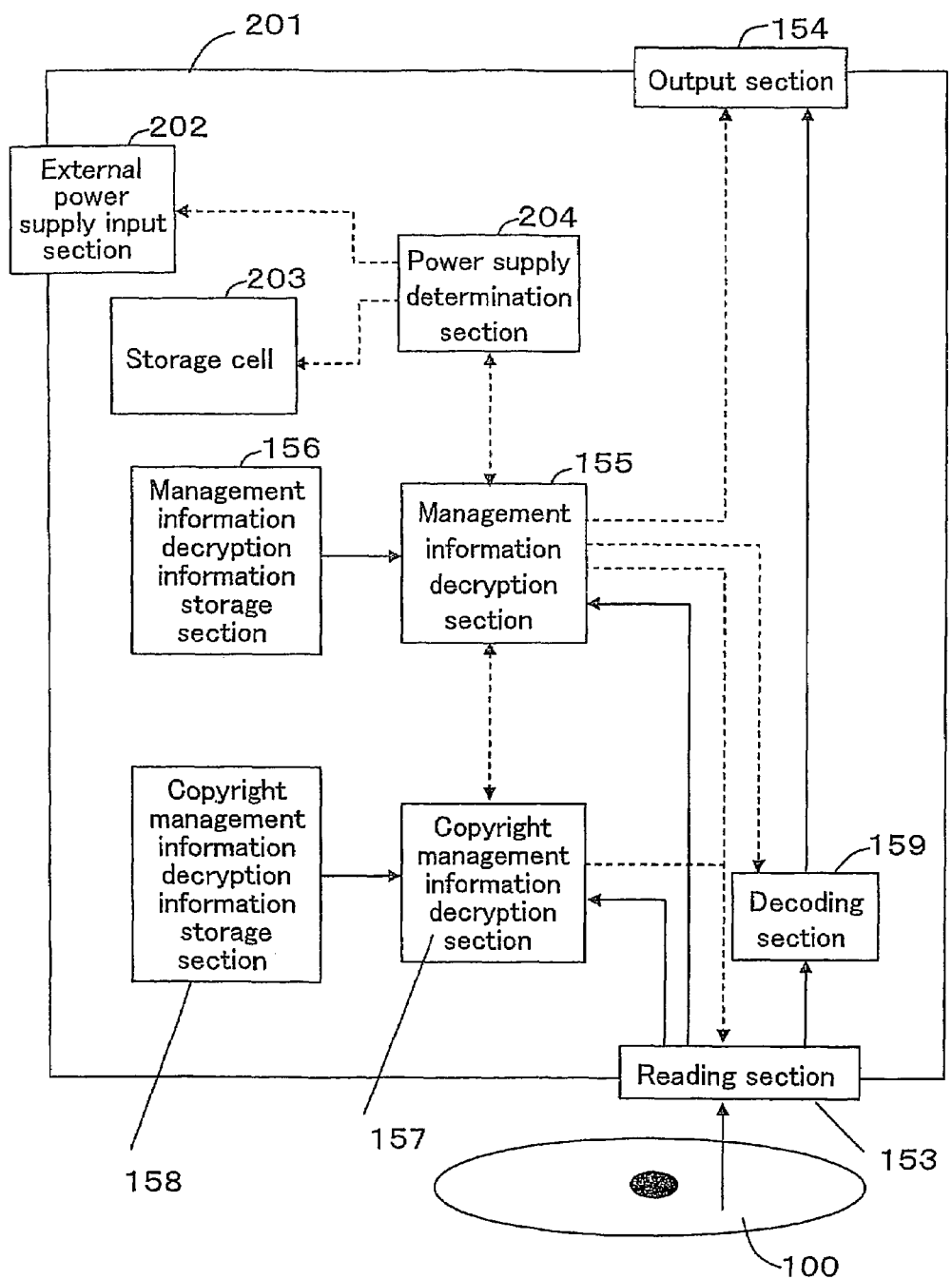
FIG. 20 shows a reproduction apparatus according to another example of the present invention.

FIG. 20 shows a reproduction apparatus 201, which is a modification of the reproduction apparatus 152. The reproduction apparatus 201 is driven by power which is supplied from at least one of an external power supply and a storage cell 203 included in the reproduction apparatus 201. In addition to the elements included in the reproduction apparatus 152, the reproduction apparatus 201 includes an external power supply input section 202, the storage cell 203, and a power supply determination section 204. For reproducing a tune in the DVD-Audio disc 100, either a tune recorded in the DVD-Audio Zone 101 or a tune recorded in the Other Zone 102 is selected in accordance with whether the power is provided from the external power supply or the storage cell 203.

Figure 21:
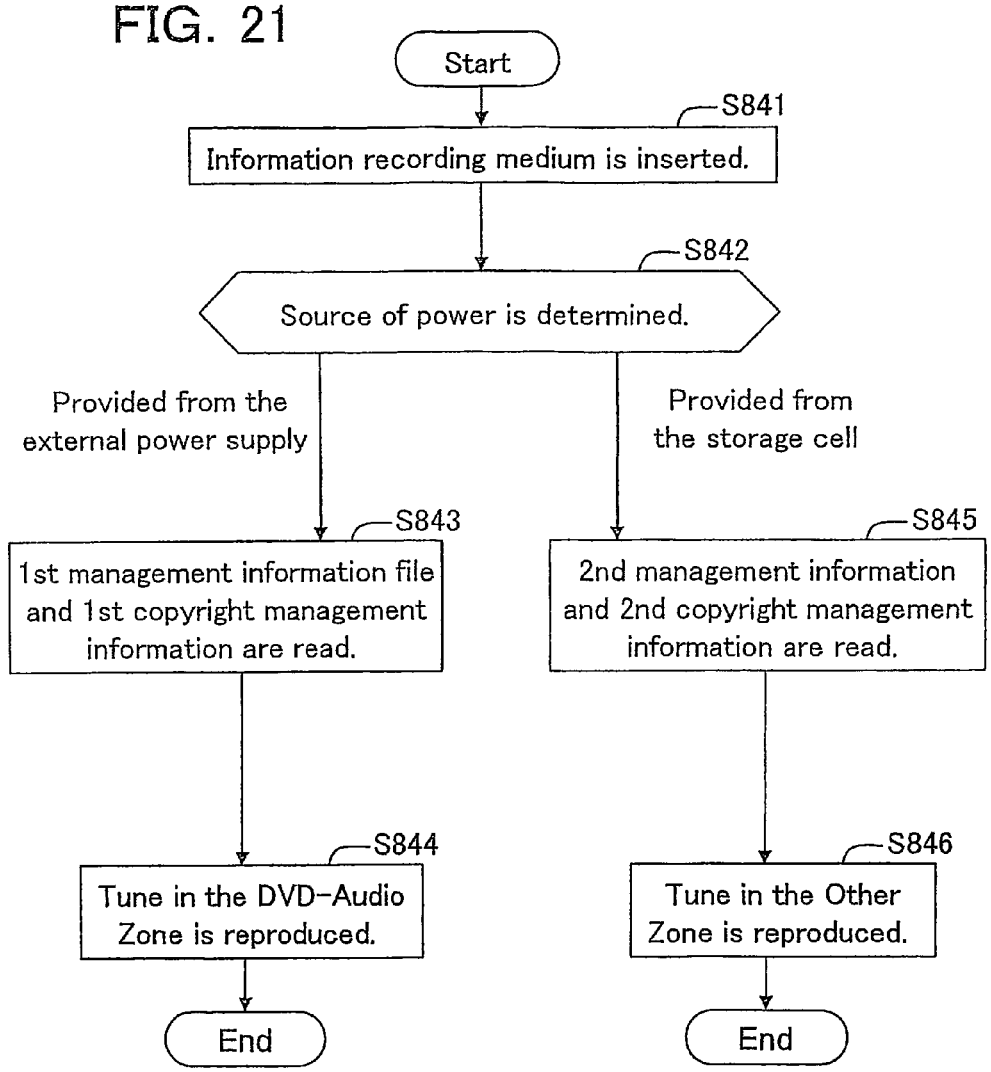
FIG. 21 is a flowchart for reproducing a tune by the reproduction apparatus shown in FIG. 20.

With reference to the flowchart in FIG. 21, the operation of the reproduction apparatus 201 will be specifically described.

When an information recording medium is inserted into the reproduction apparatus 201 (S841), the power supply determination section 204 determines whether the power is provided from the external power supply or from the storage cell 203 (S842). In the case where the power is supplied from the external power supply and a tune recorded in the DVD-Audio Zone 101 is to be reproduced, the reading section 153 reads the first management information file and the first copyright management information (S843), and thus reads the tune recorded in the DVD-Audio Zone 101 (S844). In the case where the power is supplied from the storage cell 203, the reading section 153 reads the second management information and the second copyright management information (S845), and thus reads the tune recorded in the Other Zone 102 (S846).

Thus, in the case where the reproduction apparatus 201 is driven by the storage cell 203, it is possible to reproduce the tune with the power consumption being suppressed low. For example, it is assumed that the DVD-Audio Zone 101 includes a 5-minute tune of 44.1 kHz/24 bits/6 ch recorded using linear PCM (data amount: about 240 MB), and the Other Zone 102 includes a 5-minute tune recorded using 128 kbps mp3 (data amount: about 5 MB). For reproducing the tune recorded using mp3, the data amount of 5 MB can be read into a memory in the reproduction apparatus 201 in advance. Thus, it is not necessary to keep the DVD-Audio disc 100 rotating while the tune is being reproduced. By contrast, in order to reproduce the tune recorded using linear PCM, it is necessary to keep rotating the DVD-Audio disc 100 such that the data is reproduced while being read from the DVD-Audio disc 100. The reason is that the reproduction apparatus 201 cannot have such a large memory capacity due to costs or other problems. Thus, the power consumption is suppressed smaller when the tune recorded using mp3 is reproduced than when the tune recorded using linear PCM is reproduced. Such a function of automatically reproducing compressed audio data when the power is provided from a storage cell is very convenient for a portable reproduction apparatus or the like, which can be driven by an external power supply such as an AC adaptor or the like or by a built-in storage cell.

Even when the reproduction apparatus 201 is not driven by an external power supply, the tune recorded in the Other Zone 102 can be reproduced when the tune is to be reproduced at low power.

In the above example, when the reproduction apparatus 201 is driven by the storage cell 203, the tune recorded in the Other Zone 102 is reproduced. Some users may wish to reproduce the tune recorded in the DVD-Audio Zone 101 even when the reproduction apparatus 201 is driven by the storage cell 203 although the power consumption is large. Therefore, it is desirable to allow the user to select whether or not to reproduce a tune at low power when the reproduction apparatus 201 is driven by the storage cell 203 by the initial setting or the like of the reproduction apparatus 201. As the default setting, it is desirable to set to reproduce a tune at low power when the reproduction apparatus 201 is driven by the storage cell 203. The reproduction apparatus 201 may include a primary cell instead of the storage cell 203.

The reproduction apparatus 201 may be driven both by an external power supply and a cell. In this case, the reproduction apparatus 201 may operate in substantially the same manner as when the reproduction apparatus 201 is driven by the external power supply.

Figure 22:
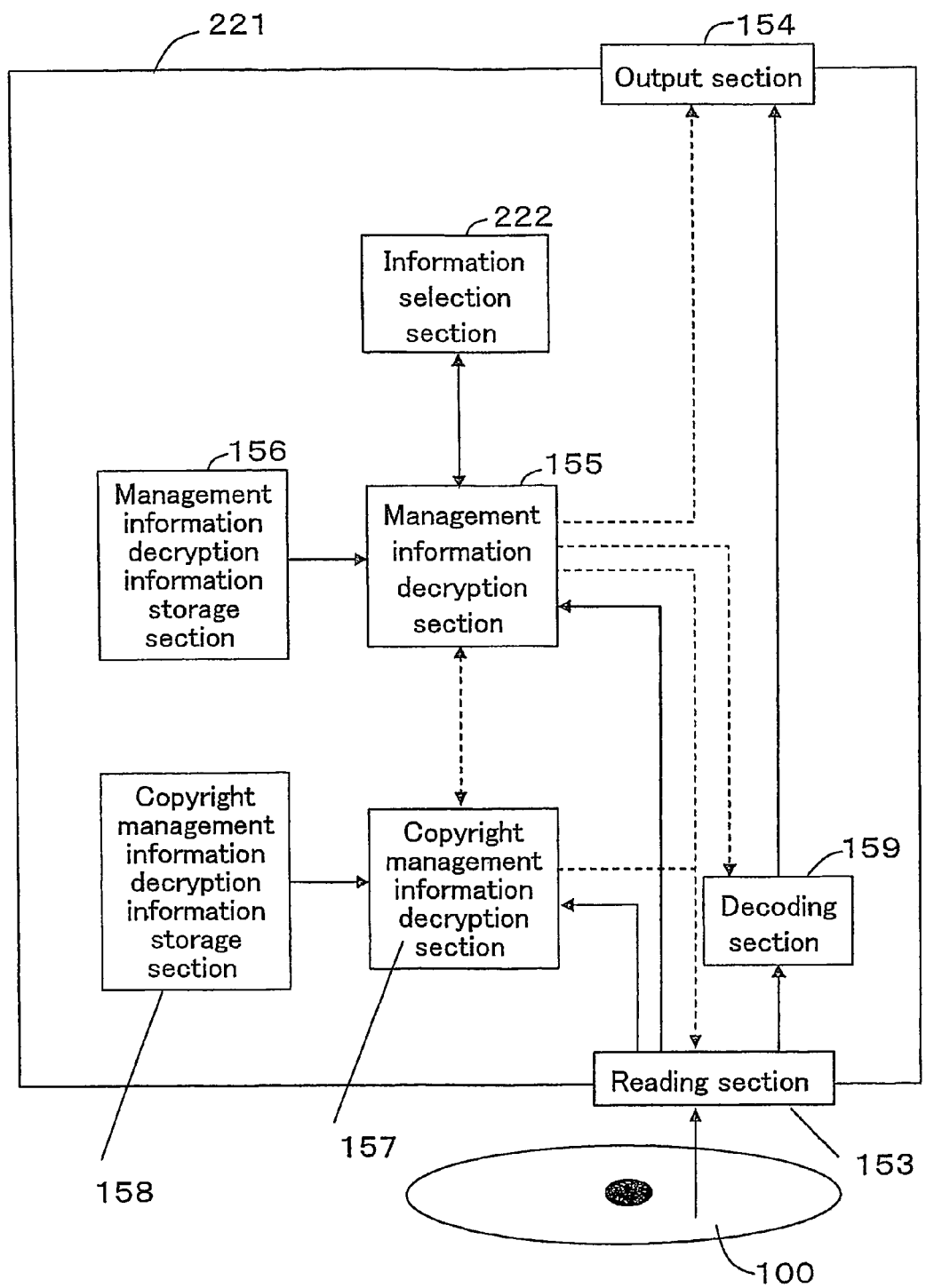
FIG. 22 shows a reproduction apparatus according to still another example of the present invention.

FIG. 22 shows a reproduction apparatus 221, which is another modification of the reproduction apparatus 152. In addition to the elements included in the reproduction apparatus 152, the reproduction apparatus 221 includes an information selection section 222. The Other Zone 102 may include different pieces of attribute information for one tune, for example, a plurality of second data files recorded by different recording systems. The information selection section 222 stores information, rules and the like, such that, when the reproduction apparatus 221 reproduces or copies a second audio data file, optimum audio data can be selected in accordance with the reproduction conditions and copying conditions.

Rules for reproduction include, for example, a rule by which audio data of a recording system reproduceable by the reproduction apparatus 221 is selected; a rule by which audio data recorded by a higher quality recording system, for example, audio data recorded by linear PCM or audio data having a large data amount, is selected among a plurality of pieces of audio data for the same tune; a rule by which, when audio data is output to be reproduced by an external device, the audio data recorded by a recording system reproduceable by the external device is selected; and a rule by which, when audio data is to be reproduced by an external device connected to the reproduction apparatus 221 via the Internet, wired LAN, wireless LAN or the like, audio data recorded by a compression recording system is selected.

Rules for copying include, for example, a rule by which audio data recorded by a compression recording system is selected for high speed copying; a rule by which audio data recorded by a recording system compatible with an information recording medium and the system as a copying destination is selected; and a rule by which, when audio data is to be reproduced by an external device connected to the reproduction apparatus 221 via the Internet, wired LAN, wireless LAN or the like, audio data recorded by compression recording system is selected.

The reproduction apparatus 221 operates as follows for reproducing or copying a tune recorded in the Other Zone 102. The management information decryption section 155 decrypts the attribute information on the tune. The information selection section 222 selects one of the plurality of audio data files in accordance with the rule owned by itself and the decryption result. The reading section 153 reads the selected audio data file.

Figure 23A:
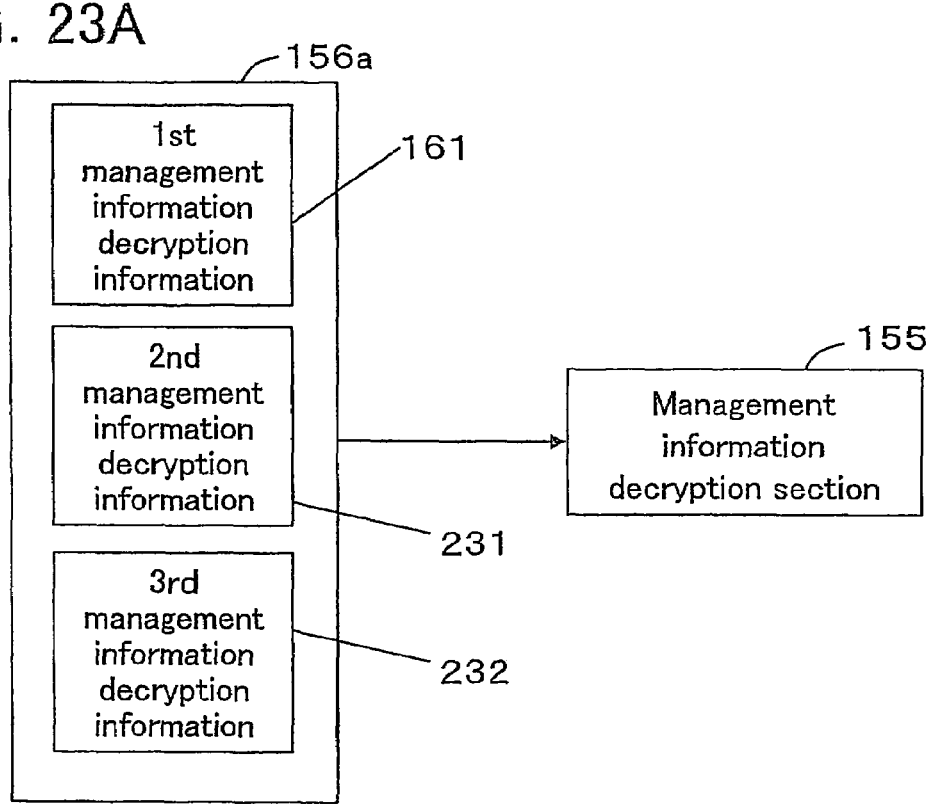
FIG. 23A shows details of the reproduction apparatus shown in FIG. 15.

The reproduction apparatus 152 may include a management information decryption information storage section 156a shown in FIG. 23A instead of the management information decryption information storage section 156. The management information decryption information storage section 156a stores first management information decryption information 161, second management information decryption information 231 for decrypting the content of the second management information file, and third management information decryption information 232 for decrypting the content of the third management information file. Thus, even when the plurality of pieces of management information are recorded in the Other Zone 102 as shown in FIG. 10, the management information which should be decrypted can be decrypted.

Figure 23B:
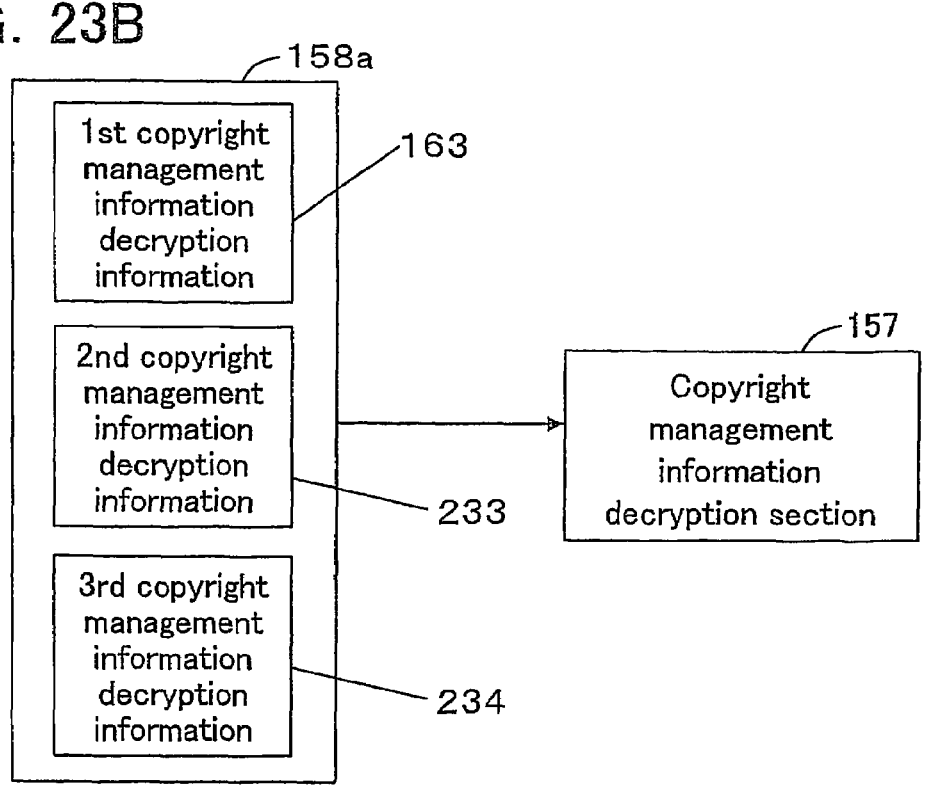
FIG. 23B shows details of the reproduction apparatus shown in FIG. 15.

The reproduction apparatus 152 may include a copyright management information decryption information storage section 158a instead of the copyright management information decryption information storage section 158 as shown in FIG. 23B. The copyright management information decryption information storage section 158a stores at least one of (i) the first copyright management information decryption information 163, (ii) second copyright management information decryption information 233 for decrypting the content of the second copyright management information file, and (iii) third copyright management information decryption information 234 for decrypting the content of the third copyright management information file. In the case where the management information decryption information storage section 156a stores the first management information decryption information 161, the copyright management information decryption information storage section 158a stores the first copyright management information decryption information 163. In the case where the management information decryption information storage section 156a stores the second management information decryption information 231, the copyright management information decryption information storage section 158a stores the second copyright management information decryption information 233. In the case where the management information decryption information storage section 156a stores the third management information decryption information 232, the copyright management information decryption information storage section 158a stores the third copyright management information decryption information 234.

The reproduction apparatus 152 basically reproduces a tune in accordance with the flowchart in FIG. 17. For reading the management information recorded in the Other Zone 102, the second management information or the third management information, which corresponds to the decryption information recorded in the management information decryption information storage section 156, is read and decrypted. When the second management information is read, the second copyright management information is read. When the third management information is read, the third copyright management information is read. The reading section 153 reads a tune which is recorded in the Other Zone 102 based on the decryption result on the management information and the copyright management information.

Which third management information corresponds to the third copyright management information is determined in advance, and the reproduction apparatus 152 searches for a file of the corresponding copyright management information based on the file name.

Figure 24:
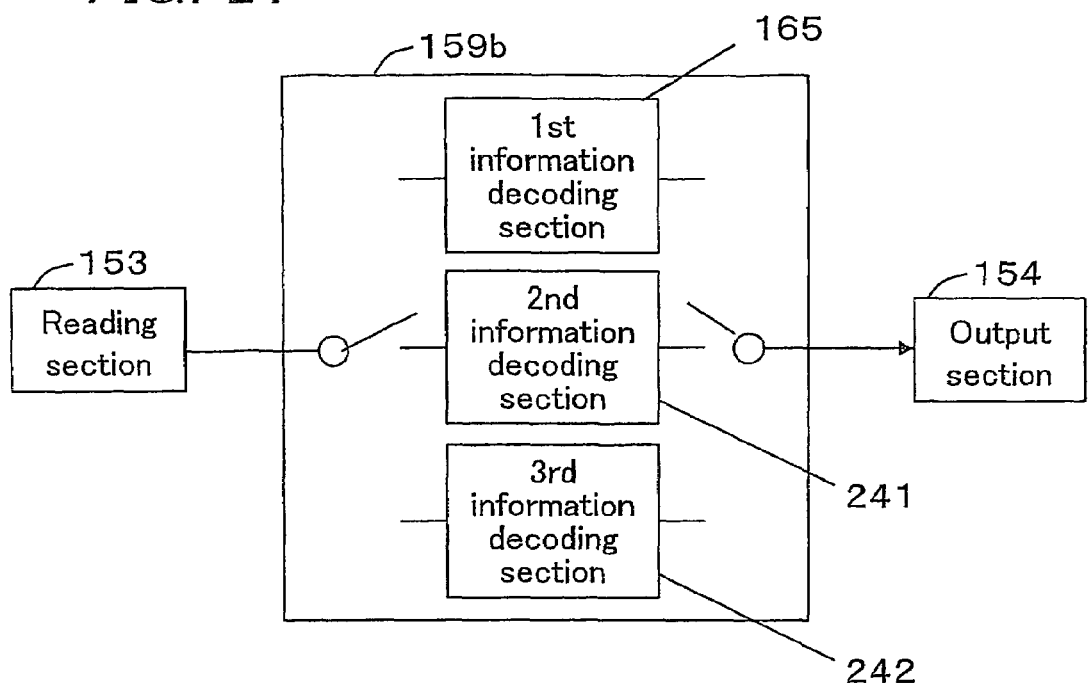
FIG. 24 shows a decoding section of the reproduction apparatus shown in FIG. 15.

The reproduction apparatus 152 may include a decoding section 159b shown in FIG. 24 instead of the decoding section 159. The decoding section 159b includes at least one of (i) the first information decoding section 165, (ii) a second information decoding section 241 for decoding audio data managed by the second management information, and (iii) a third information decoding section 242 for decoding audio data managed by the third management information.

It is possible that the plurality of second audio data files respectively managed by the plurality of pieces of management information recorded in the Other Zone 102 are encrypted by different encryption systems. The decoding section 159b has a decoding function corresponding to the encryption system which is managed by the management information which can be decrypted by the reproduction apparatus 152. For example, when the reproduction apparatus 152 can decrypt the first management information file, the second management information file, and the third management information file, the decoding section 159b includes, as shown in FIG. 24, the first information decoding section 165, the second information decoding section 241, and the third information decoding section 242. For decoding audio data read by the reproduction apparatus 152 from an information recording medium, the decoding section corresponding to the management information which manages the audio data is used for decoding.

Figure 25:
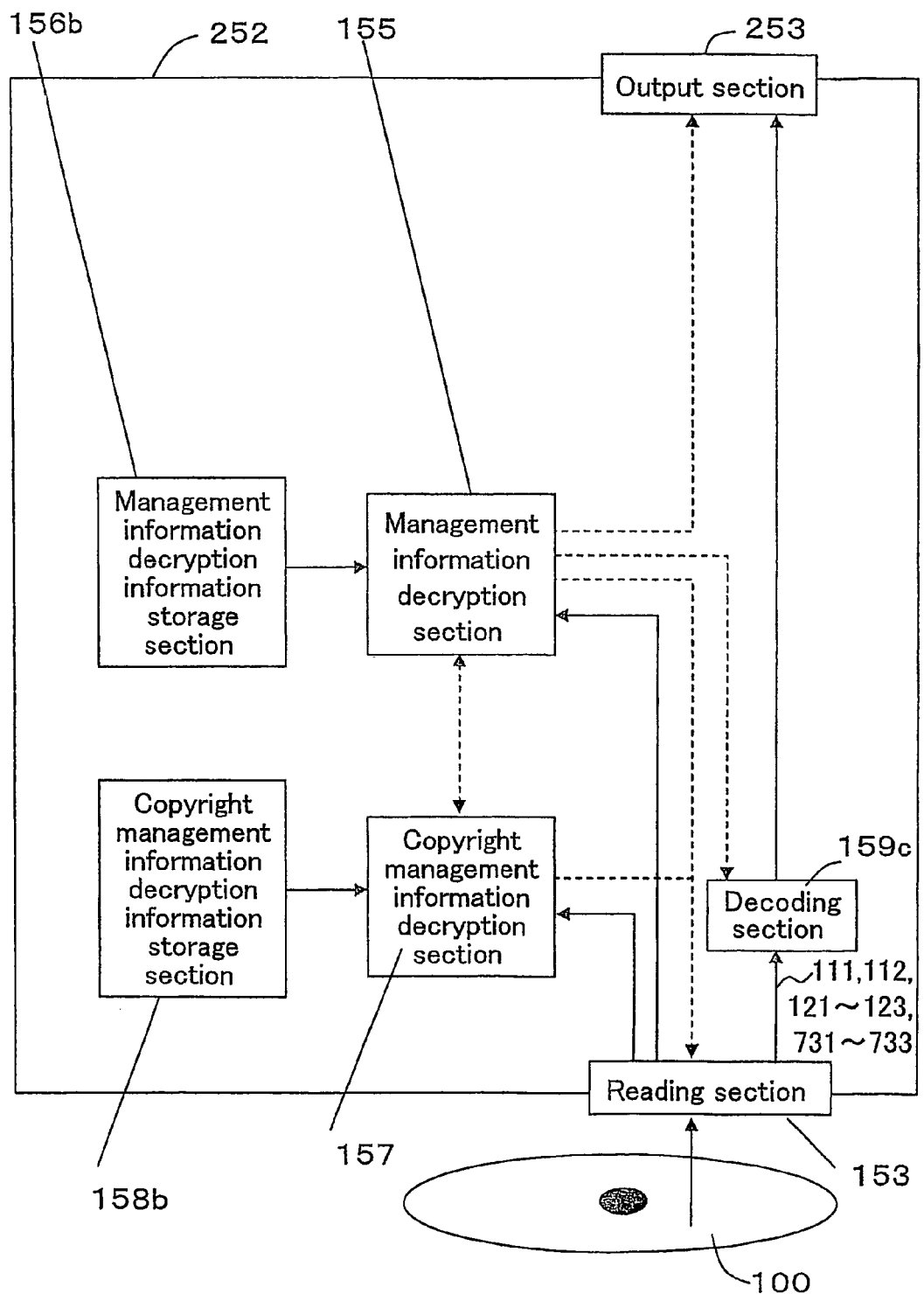
FIG. 25 shows a reproduction apparatus according to still another example of the present invention.

FIG. 25 shows a reproduction apparatus 252, which is still another modification of the reproduction apparatus 152. The reproduction apparatus 252 includes a management information decryption information storage section 156b, a copyright management information decryption information storage section 158b, and a decoding section 159a, instead of the management information decryption information storage section 156, the copyright management information decryption information storage section 158, and the decoding section 159.

Figure 26:
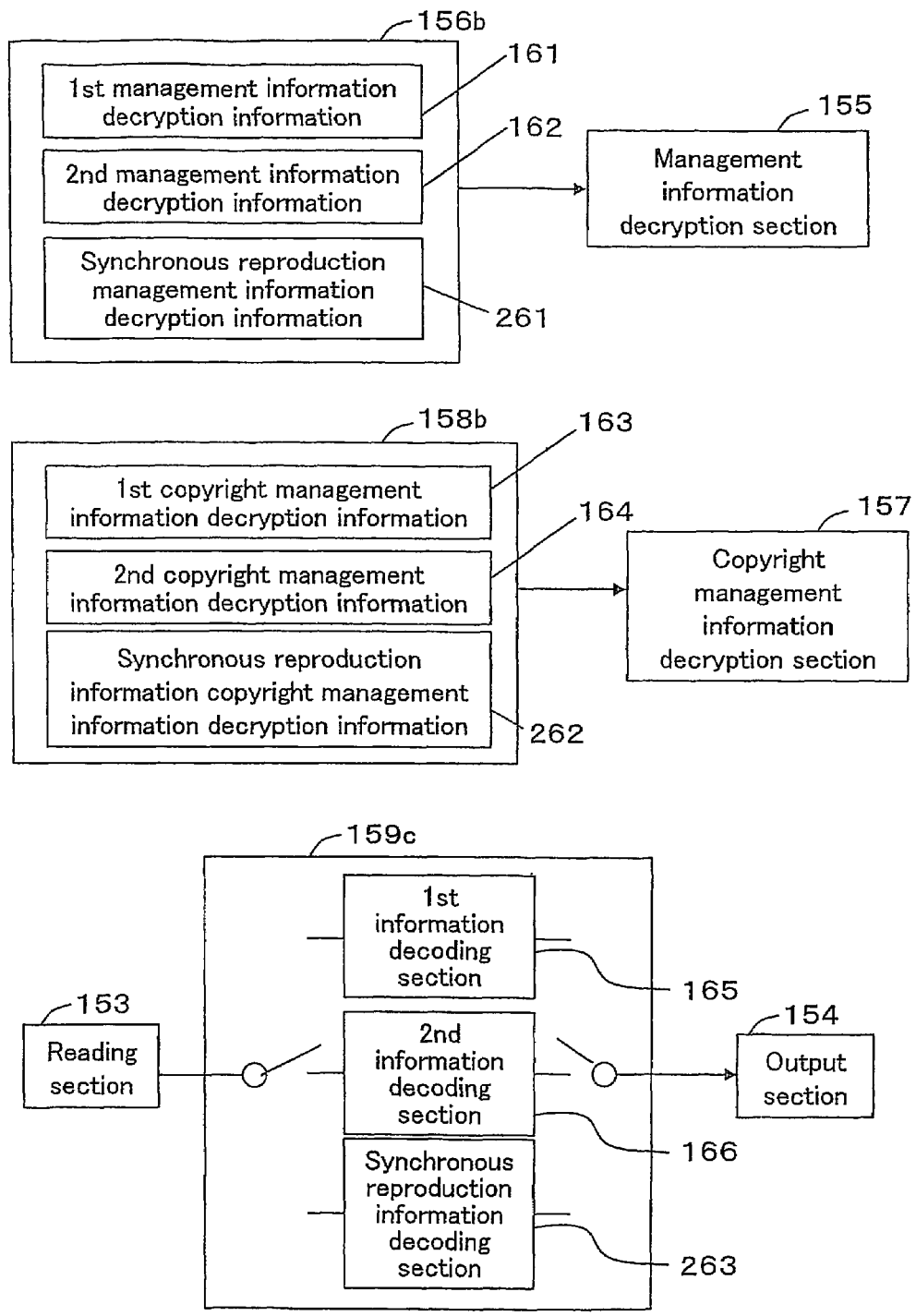
FIG. 26 shows details of the reproduction apparatus shown in FIG. 25.

As shown in FIG. 26, the management information decryption information storage section 156b stores the first management information decryption information 161, the second management information decryption information 162, and synchronous reproduction management information decryption information 261 for decrypting the content of a synchronous reproduction management information file.

The copyright management information decryption information storage section 158b stores the first copyright management information decryption information 163, the second copyright management information decryption information 164, and synchronous reproduction information copyright management information decryption information 262 for decrypting the content of the synchronous reproduction information copyright management information file 734.

The decoding section 159c includes the first information decoding section 165, the second information decoding section 166, and a synchronous reproduction information decoding section 263. The synchronous reproduction information decoding section 263 decodes encrypted information managed by the synchronous reproduction management information (in this example, encrypted still picture data).

The first management information decryption information 161, the first copyright management information decryption information 163, and the first information decoding section 165 are not necessarily provided.

In the case where, as shown in FIG. 14, the Other Zone 102 has the synchronous reproduction management information file 730, synchronous reproduction information copyright management information file 734, and the still picture data files 731, 732 and 733 recorded therein, the still picture data files can be reproduced in synchronization with the second audio data files, respectively.

Figure 27:
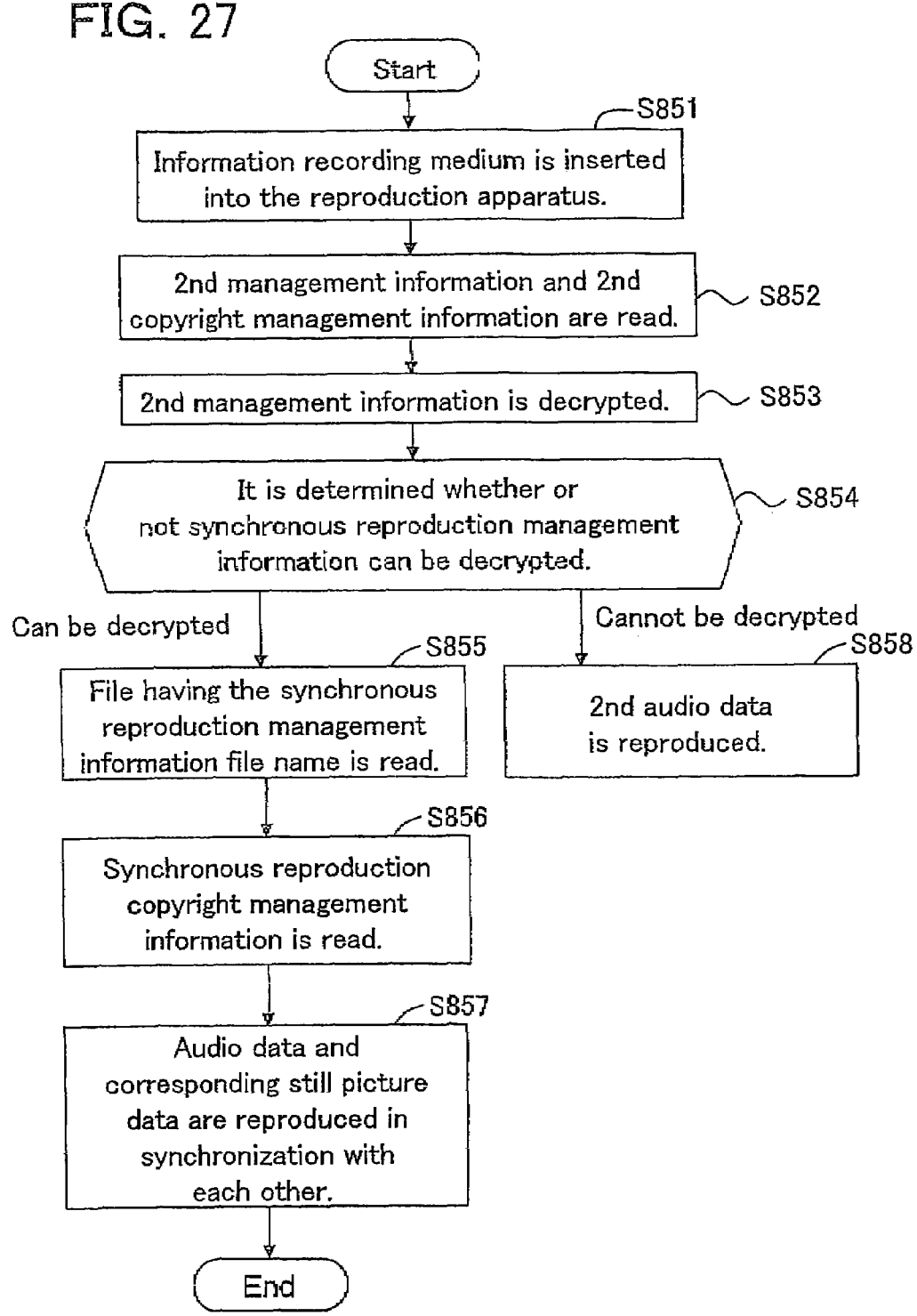
FIG. 27 is a flowchart for reproducing a tune by the reproduction apparatus shown in FIG. 25.

With reference to the flowchart in FIG. 27, the operation of the reproduction apparatus 252 for reproducing the second audio data and the still picture data in synchronization with each other will be specifically described.

When an information recording medium is inserted into the reproduction apparatus 252 (S851), the reading section 153 reads the second management information, and outputs the information to the management information decryption section 155. The reading section 153 also reads the second copyright management information, and outputs the information to the copyright management information decryption section 157 (S852). The management information decryption section 155 decrypts the synchronous reproduction management information related information included in the second management information (S853). It is determined, based on the management information type indicated by the synchronous reproduction management information related information, whether or not the synchronous reproduction management information file 730 represents management information which can be decrypted by the reproduction apparatus 252 (S854). When it is determined that the synchronous reproduction management information file 730 does not represent the management information which can be decrypted by the reproduction apparatus 252, only the second audio file is reproduced (S858).

When it is determined that the synchronous reproduction management information file 730 represents the management information which can be decrypted by the reproduction apparatus 252, the synchronous reproduction management information file name included in the synchronous reproduction management information related information is read (S855). Based on the synchronous reproduction management information file name, the reading section 153 reads the synchronous reproduction management information, and outputs the information to the management information decryption section 155 (S856).

For reproducing a prescribed second audio data file, the copyright management information decryption section 157 determines whether or not the second audio data file is permitted to be reproduced. When it is determined that the second audio data file is permitted to be reproduced, the management information decryption section 155 decrypts the synchronous reproduction management information using the synchronous reproduction management information decryption information 261, and specifies the still picture data which is to be reproduced while the audio data is being reproduced. The copyright management information decryption section 157 decrypts the synchronous reproduction copyright management information using the synchronous reproduction copyright management information decryption information 262, and determines whether or not the still picture data is permitted to be reproduced. When it is determined that the still picture data is permitted to be reproduced, the reading section 153 reads the second audio data and the still picture data specified by the management information decryption section 155, and outputs the audio data and the still picture data to the decoding section 159c. In the case where the second audio data file and the still picture data are encrypted, the decoding section 159c decodes the data as follows. The second information decoding section 166 decodes the encrypted second audio data file, and the synchronous reproduction information decoding section 263 decodes the encrypted still picture data. The output section 253 outputs the decoded second audio data file and the still picture data in synchronization with each other (S857).

For determining whether or not the reproduction apparatus 252 can decrypt the synchronous reproduction management information, the management information type is used in the above example. The determination may be performed based on the synchronous reproduction management information file name included in the synchronous reproduction management information related information. In the case where the synchronous reproduction management information file name is determined in advance, there are cases where the synchronous reproduction management information related information is not recorded in the second management information. In this case, the reproduction apparatus 252 searches for a file including synchronous reproduction management information which can be decrypted by the synchronous reproduction management information decryption information, from the information recording medium based on the file name. The reading section 153 reads such a file, and outputs the file to the management information decryption section 155.

In the above example, reproduction apparatuses for reproducing data on DVD-Audio discs are described. The present invention is applicable to other types of information recording mediums and applications, and also reproduction apparatuses for reproducing data on such other types of information recording medium and such other types of applications.

According to the present invention, even when a tune recorded in a DVD-Audio Zone of an information recording medium is prohibited from being copied, a tune recorded in an Other Zone can be automatically copied. This allows data to be copied at high speed. In a portable reproduction apparatus, low power reproduction is possible.

According to the present invention, data files which have the same content but are recorded by different recording system are recorded separately in two recording areas. Thus, different pieces of copyright management information can be applied to the contents recorded in the two recording areas. The contents can be handled in various manners.

A non-compressed content is recorded in an area while a content which is obtained by compressing the non-compressed content is recorded in another area. Thus, the non-compressed content is reproduced at high quality, while the compressed content is copied at high speed. The compressed content can be reproduced at low power.

INDUSTRIAL APPLICABILITY

According to an information recording medium and an information reproduction apparatus of the present invention, a content of an information recording medium can be copied at high speed and reproduced at low power. In addition, the copyright of a plurality of contents recorded on one information recording medium can be handled differently. The present invention is especially useful for information recording mediums such as, for example, CDs, DVDs, Blue Ray discs, semiconductor memories, and hard discs; reproduction apparatuses for reproducing information recording mediums such as, for example, CD players, DVD players, Blue Ray disc players, semiconductor memory players, and software players including personal computers; and reproduction apparatuses having a function of being driven by a storage cell such as, for example, portable players.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

The invention claimed is:

1. An information recording medium comprising:

a first recording area for recording first audio information and first management information for managing the first audio information; and a second recording area for recording second audio information and second management information for managing the second audio information, the second audio information having a same content as, and different attribute than, the first audio information, wherein:

the first management information specifies the first audio information using a group number and a track number, the second management information specifies the second audio information using an identification number, the second management information includes link information which indicates that the first audio information and the second audio information are related to each other, and the link information includes the group number and the track number for specifying the first audio information, the link information further includes the identification number specifying the second audio information, and the link information is configured such that the link information can be searched based on the inclusion of the group number and the track number to obtain the second audio information as specified from the identification number of the second audio information indicated by the link information found by the search.

2. An information recording medium according to claim 1, wherein:

the second audio information is a compressed form of the first audio information.

3. A reproduction apparatus for reproducing at least one of first audio information and second audio information related to the first audio information, which are recorded on an information recording medium, wherein the information recording medium includes:

a first recording area for recording first audio information and first management information for managing the first audio information; and a second recording area for recording second audio information and second management information for managing the second audio information, the second audio information having a same content as, and different attribute than, the first audio information, wherein the first management information specifies the first audio information using a group number and a track number, the second management information specifies the second audio information using an identification number, the second management information includes link information which indicates that the first audio information and the second audio information are related to each other, and the link information includes the group number and the track number for specifying the first audio information, the link information further includes the identification number specifying the second audio information, and the link information is configured such that the link information can be searched based on the inclusion of the group number and the track number to obtain the second audio information as specified from the identification number of the second audio information indicated by the link information found by the search, the reproduction apparatus comprising:

a reading section operable to read at least one of the first audio information, the second audio information, the first management information and the second management information from the information recording medium;

a storage section having, stored therein, at least one of first decryption information for decrypting the first management information and the second decryption information for decrypting the second management information;

a decryption section operable to decrypt at least one of the first management information and the second management information; and an output section operable to output at least one of the first audio information and the second audio information in accordance with the corresponding attribute of the first audio information and second audio information, when the first decryption information is stored in the storage section and the first audio information is to be reproduced, the reading section reads the first management information from the information recording medium, the decryption section decrypts the first management information based on the first decryption information, the reading section reads the first audio information from the information recording medium, based on the decryption result of the first management information, and the output section outputs the first audio information in accordance with the corresponding attribute of the first audio information, when the second decryption information is stored in the storage section and the second audio information is to be reproduced, the reading section reads the second management information from the information recording medium, the decryption section decrypts the second management information based on the second decryption information, the reading section reads the second audio information from the information recording medium, based on the decryption result of the second management information, and the output section outputs the second audio information in accordance with the corresponding attribute of the second audio information, when the reproduction apparatus receives an instruction to copy the first audio information, the reading section reads the link information from the information recording medium, the decryption section decrypts the link information so as to specify the second audio information related to the first audio information, the reading section reads the specified second audio information from the information recording medium, and the output section outputs the specified second audio information in accordance with the corresponding attribute of the second audio information.

4. A reproduction apparatus according to claim 3, further comprising a determination section operable to determine whether or not the power for the reproduction apparatus is supplied from an external power supply, wherein:

when the determination section determines that the power for the reproduction apparatus is supplied from the external power supply, the output section outputs the first audio information, and when the determination section determines that the power for the reproduction apparatus is not supplied from the external power supply, the output section outputs the second audio information.

5. A reproduction apparatus according to claim 3, wherein: the second audio information is a compressed form of the first audio information.

6. A reproduction method for reproducing at least one of first audio information and second audio information related to the first audio information, which are recorded on an information recording medium, wherein the information recording medium includes:

a first recording area for recording first audio information and first management information for managing the first audio information; and a second recording area for recording second audio information and second management information for managing the second audio information, the second audio information having a same content as, and different attribute than, the first audio information, wherein the first management information specifies the first audio information using a group number and a track number, the second management information specifies the second audio information using an identification number, the second management information includes link information which indicates that the first audio information and the second audio information are related to each other, and the link information includes the group number and the track number for specifying the first audio information, the link information further includes the identification number specifying the second audio information, and the link information is configured such that the link information can be searched based on the inclusion of the group number and the track number to obtain the second audio information as specified from the identification number of the second audio information indicated by the link information found by the search, the reproduction method comprising the steps of:

(a) reproducing the first audio information using first decryption information for decrypting the first management information;

(b) reproducing the second audio information using second decryption information for decrypting the second management information; and (c) performing a copy process in response to an instruction to copy the first audio information, wherein:

the step (a) includes the steps of:

reading the first management information from the information recording medium;

decrypting the first management information based on the first decryption information;

reading the first audio information from the information recording medium, based on the decryption result of the first management information; and outputting the first audio information in accordance with the corresponding attribute of the first audio information, the step (b) includes the steps of:

reading the second management information from the information recording medium;

decrypting the second management information based on the second decryption information;

reading the second audio information from the information recording medium, based on the decryption result of the second management information; and outputting the second audio information in accordance with the corresponding attribute of the second audio information, the step (c) includes the steps of:

reading the link information from the information recording medium;

decrypting the link information so as to specify the second audio information related to the first audio information;

reading the specified second audio information from the information recording medium; and outputting the specified second audio information in accordance with the corresponding attribute of the second audio information.

7. A program for making a computer execute a reproduction process for reproducing at least one of first audio information and second audio information related to the first audio information, which are recorded on an information recording medium, wherein the information recording medium includes:

a first recording area for recording first audio information and first management information for managing the first audio information; and a second recording area for recording second audio information and second management information for managing the second audio information, the second audio information having a same content as, and different attribute than, the first audio information, wherein the first management information specifies the first audio information using a group number and a track number, the second management information specifies the second audio information using an identification number, the second management information includes link information which indicates that the first audio information and the second audio information are related to each other, and the link information includes the group number and the track number for specifying the first audio information, the link information further includes the identification number specifying the second audio information, and the link information is configured such that the link information can be searched based on the inclusion of the group number and the track number to obtain the second audio information as specified from the identification number of the second audio information indicated by the link information found by the search, the reproduction process comprising the steps of:

(a) reproducing the first audio information using first decryption information for decrypting the first management information;

(b) reproducing the second audio information using second decryption information for decrypting the second management information; and (c) performing a copy process in response to an instruction to copy the first audio information, wherein:

the step (a) includes the steps of:

reading the first management information from the information recording medium;

decrypting the first management information based on the first decryption information;

reading the first audio information from the information recording medium, based on the decryption result of the first management information; and outputting the first audio information in accordance with the corresponding attribute of the first audio information, the step (b) includes the steps of:

reading the second management information from the information recording medium;

decrypting the second management information based on the second decryption information;

reading the second audio information from the information recording medium, based on the decryption result of the second management information; and outputting the second audio information in accordance with the corresponding attribute of the second audio information, the step (c) includes the steps of:

reading the link information from the information recording medium;

decrypting the link information so as to specify the second audio information related to the first audio information;

reading the specified second audio information from the information recording medium; and outputting the specified second audio information in accordance with the corresponding attribute of the second audio information.

\* \* \* \* \*